United States Patent
Miller et al.

(10) Patent No.: US 11,100,168 B2
(45) Date of Patent: Aug. 24, 2021

(54) AUTOMATED POPULATION OF DIGITAL INTERFACES BASED ON DYNAMICALLY GENERATED CONTEXTUAL DATA

(71) Applicant: The Toronto-Dominion Bank, Toronto (CA)

(72) Inventors: Robert Kyle Miller, Mississauga (CA); Sonja Torbica, Toronto (CA); Helene Nicole Esposito, Mississauga (CA); Harrison Michael James Reilly, Toronto (CA); Matta Wakim, Petersburg (CA); Kyryll Odobetskiy, Waterloo (CA); Dexter Lamont Fichuk, Kitchener (CA); Adam Douglas McPhee, Waterloo (CA); Omas Abdullah, Waterloo (CA)

(73) Assignee: The Toronto-Dominion Bank, Toronto (CA)

( * ) Notice: Subject to any disclaimer, the term of this patent is extended or adjusted under 35 U.S.C. 154(b) by 82 days.

(21) Appl. No.: 16/037,057

(22) Filed: Jul. 17, 2018

(65) Prior Publication Data

US 2020/0026778 A1 Jan. 23, 2020

(51) Int. Cl.
*G06F 17/00* (2019.01)
*G06F 16/9032* (2019.01)
*H04W 4/02* (2018.01)
*G06F 3/023* (2006.01)
*G06N 20/00* (2019.01)

(52) U.S. Cl.
CPC ...... *G06F 16/90324* (2019.01); *G06F 3/0237* (2013.01); *G06N 20/00* (2019.01); *H04W 4/02* (2013.01)

(58) Field of Classification Search
CPC ..... G06N 20/00; G06F 3/0237; G06F 3/0482; H04W 4/02; H04W 4/023; H04L 51/32; G06Q 20/3224; G06Q 20/325; G06Q 20/20; G06Q 30/0633; G06Q 20/22; G06Q 20/40145; G06Q 20/3278
USPC ........................................................ 715/764
See application file for complete search history.

(56) References Cited

U.S. PATENT DOCUMENTS

| 7,984,484 | B1* | 7/2011 | Rakowski ............... H04L 51/00 726/3 |
| 8,401,942 | B2 | 3/2013 | Hansen et al. |
| 8,554,647 | B1 | 10/2013 | Grigg et al. |

(Continued)

*Primary Examiner* — Jason T Edwards
(74) *Attorney, Agent, or Firm* — Duane Morris LLP

(57) ABSTRACT

The disclosed exemplary embodiments include computer-implemented systems, apparatuses, and processes that, among other things, automatically populate, in real-time, portions of digital interfaces based on dynamically generated contextual data. For example, a network-connected apparatus may receive, from a device, a portion of an identifier of a first counterparty to an exchange of data. The apparatus may perform operations determine a second counterparty to the data exchange based on at least one of a current geographic position of the first device, a first element of profile data associated with the first device, or the received portion of the first counterparty identifier, and may transmit an identifier of the second counterparty to the device. The device may execute an application program that presents the second counterparty identifier within a corresponding portion of an interface associated with the data exchange.

18 Claims, 9 Drawing Sheets

(56) References Cited

U.S. PATENT DOCUMENTS

| | | |
|---|---|---|
| 8,818,839 B2 | 8/2014 | Leff et al. |
| 8,984,074 B2 | 3/2015 | Monaco |
| 9,483,565 B2 | 11/2016 | Tomkins et al. |
| 9,767,503 B2 | 9/2017 | Grigg et al. |
| 2010/0125495 A1 | 5/2010 | Smith et al. |
| 2011/0202459 A1 | 8/2011 | Shah et al. |
| 2013/0041824 A1* | 2/2013 | Gupta ............... G06Q 40/00 705/44 |
| 2013/0085931 A1* | 4/2013 | Runyan ............ G06Q 20/322 705/40 |
| 2014/0244490 A1 | 8/2014 | Miller et al. |
| 2014/0325016 A1* | 10/2014 | Chen ............... H04L 67/1095 709/217 |
| 2016/0275476 A1 | 9/2016 | Artman et al. |
| 2016/0328709 A1 | 11/2016 | Romm et al. |
| 2017/0142554 A1* | 5/2017 | Li ...................... H04W 4/21 |
| 2017/0169497 A1 | 6/2017 | Lee et al. |
| 2017/0178110 A1 | 6/2017 | Swanson et al. |
| 2018/0039384 A1* | 2/2018 | DeLuca ............. H04W 4/80 |

* cited by examiner

US 11,100,168 B2

AUTOMATED POPULATION OF DIGITAL INTERFACES BASED ON DYNAMICALLY GENERATED CONTEXTUAL DATA

TECHNICAL FIELD

The disclosed embodiments generally relate to computer-implemented systems and processes that automatically populate, in real-time, portions of digital interfaces based on dynamically generated contextual data.

BACKGROUND

Today, payment systems and related technologies continue to evolve in response to advances in payment processing, such as the ongoing transition from branch banking to mobile banking processes performed on a mobile device. While these innovations result in additional mechanisms for submitting payment to an electronic or physical merchant, and for flexibly funding transactions initiated by the electronic or physical merchant, these innovations can also extend beyond the input and display capabilities of many mobile devices.

SUMMARY

In some examples, an apparatus includes a communications unit, a storage unit storing instructions, and at least one processor coupled to the communications unit and the storage unit. The at least one processor is configured to execute the instructions to receive a first signal from a first device via the communications unit. The first signal includes a portion of an identifier of a first counterparty to an exchange of data, and the data exchange is capable of initiation using an application program executed by the first device. The at least one processor is also configured to determine a second counterparty to the data exchange based on at least one of a current geographic position of the first device, a first element of profile data associated with the first device, or the received portion of the first counterparty identifier. Further, the at least one processor is configured to generate and transmit, to the first device via the communications unit, a second signal that includes an identifier of the second counterparty. The second signal includes information that causes the executed application program to present the second counterparty identifier within a corresponding portion of an interface associated with the data exchange.

In other examples, a computer-implemented method includes receiving, by one or more processors, a first signal from a device. The first signal includes a portion of an identifier of a first counterparty to an exchange of data, and the data exchange is capable of initiation using an application program executed by the device. The computer-implemented method also includes determining, by the one or more processors, a second counterparty to the data exchange based on at least one of a current geographic position of the device, an element of profile data associated with the device, or the received portion of the first counterparty identifier, and generating and transmitting, by the one or more processors, a second signal that includes an identifier of the second counterparty to the device. The second signal includes information that causes the executed application program to present the second counterparty identifier within a corresponding portion of an interface associated with the data exchange.

Further, in additional examples, an apparatus includes a communications unit, a storage unit storing instructions, and at least one processor coupled to the communications unit and the storage unit. The at least one processor is configured to execute the instructions to receive a first signal from a device via the communications unit. The first signal includes a portion of a first identifier of a first counterparty to an exchange of data, the data exchange is capable of initiation using an application program executed by the device, and the device is configured to receive the portion of the first identifier as an input to an element of an interface generated by the executed application program. The at least one processor is also configured to determine a plurality of second counterparties to the data exchange based on at least one of a current geographic position of the device or an element of profile data associated with the device, establish that a second identifier of a corresponding one of the second counterparties is consistent with the received portion of the first counterparty identifier, and generate and transmit, to the device via the communications unit, a second signal that includes the second identifier. The second signal includes information that causes the executed application program to present the second identifier within the element of the generated interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
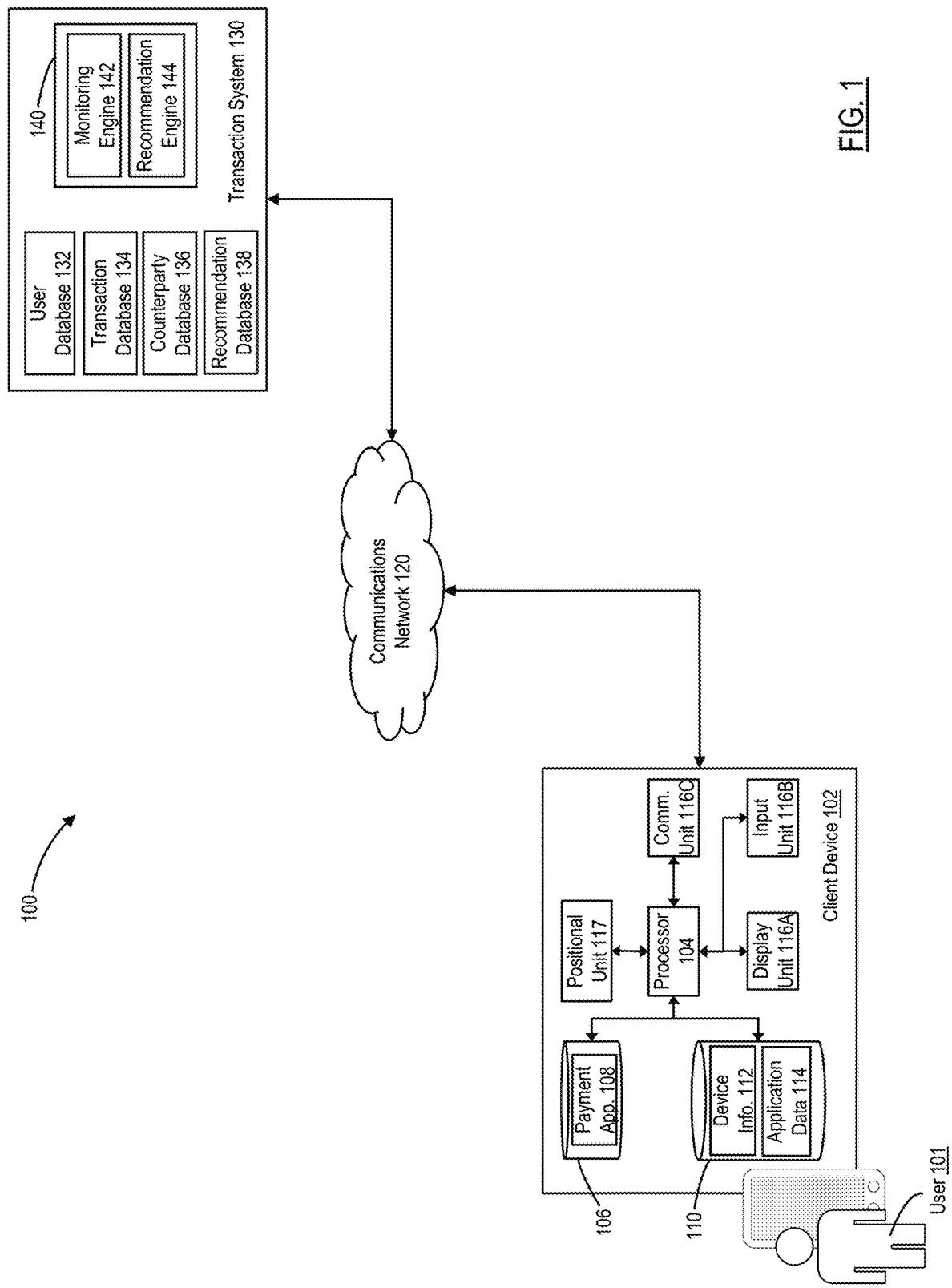
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include, but is not limited to, one or more devices, such as client device 102 operated by user 101, and one or more network-connected computing systems, such as transaction system 130. In some instances, client device 102 and transaction system 130 may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some embodiments, client device 102 may include a computing device having one or more tangible, non-transitory memories that store data and/or software instructions, and one or more processors, e.g., processor 104, configured to execute the software instructions. The one or more tangible, non-transitory memories may, in some aspects, store application programs, application modules, and other elements of code executable by the one or more processors, e.g., within executable application data 106. For example, as illustrated in FIG. 1, client device 102 may maintain, within executable application data 106, an executable application associated with a financial institution, such as a payment application 108 provisioned to client device 102 by one or more network-connected computing systems operating within environment 100 (e.g., transaction system 130), one or more executable web browsers (e.g., Google Chrome™), or one or more executable messaging applications (e.g., WhatsApp™) The disclosed embodiments are, however, not limited to these exemplary application programs, and in other examples, executable application data 106 may include any additional or alternate application program, application module, and other elements of code executable by client device 102.

Client device 102 may also establish and maintain, within the one or more tangible, non-transitory memories, one or more structured or unstructured data repositories or databases, e.g., data repository 110, that include device information 112 and application data 114. Device information 112 may include information that uniquely identifies client device 102, such as a media access control (MAC) address of client device 102 or an Internet Protocol (IP) address assigned to client device 102. Further, in some instances, device information 112 may also include positional data indicative of a current geographic position of client device 102 (e.g., as obtained via an embedded positioning unit, such as a Global Positioning System (GPS) unit, an assisted GPS (aGPS) unit, etc.). In other instances, the positional data may also specify one or more prior geographic positions of client device 102 and corresponding times or dates of capture), which collectively establish a temporal evolution in the geographic position of client device 102 during prior temporal intervals.

Application data 114 may include information that facilitates, or supports, an execution of any of the application programs described herein, such as, but limited to, supporting information that enables executable payment application 108 to authenticate an identity of a user operating client device 102, such as user 101. Examples of this supporting information include, but are not limited to, one or more alphanumeric login or authentication credentials assigned to user 101, e.g., by transaction system 130, or one or more biometric credentials of user 101, such as fingerprint data or a digital image of a portion of user 101's face, or other information facilitating a biometric or multi-factor authentication of user 101. Further, in some instances, application data 114 may include additional information that identifies and characterizes one or more exchanges of data previously initiated by corresponding ones of the application programs upon execution by processor 104.

Additionally, in some examples, client device 102 may also include a display unit 116A configured to present interface elements to user 101, and an input unit 116B configured to receive input from user 101, e.g., in response to the interface elements presented through display unit 116A. By way of example, display unit 116A may include, but is not limited to, an LCD display unit or other appropriate type of display unit, and input unit 116B may include, but is not limited to, a keypad, keyboard, touchscreen, fingerprint scanner, voice activated control technologies, or appropriate type of input unit. Further, in additional instances (not depicted in FIG. 1), the functionalities of display unit 116A and input unit 116B may be combined into a single device, e.g., a pressure-sensitive touchscreen display unit that presents interface elements and receives input from user 101. Client device 102 may also include a communications unit 112C, such as a wireless transceiver device, coupled to processor 104 and configured by processor 104 to establish and maintain communications with network 120, e.g., via WiFi®, Bluetooth®, NFC, or cellular communications protocols (e.g., LTE®, CDMA®, GSM®, etc.).

Additionally, in some aspects, client device 102 may include a positioning unit 117, such as, but not limited to, a Global Positioning System (GPS) unit, an assisted GPS (aGPS) unit, or a sensor consistent with other positioning systems. Positioning unit 117 may be configured by processor 104 to determine a geographic location of client device 102 (e.g., a latitude, longitude, altitude, etc.) at regular temporal intervals, and to store data indicative of the determined geographic location within a portion of corresponding tangible, non-transitory memory (e.g., within a portion of device information 112), along with data identifying the temporal interval (e.g., a time and/or date).

Examples of client device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments.

Referring back to FIG. 1, transaction system 130 may represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments. In other instances, and consistent with the disclosed embodiments, transaction system 130 may correspond to a distributed system that includes computing components distributed across one or more networks, such as network 120, or other networks, such as those provided or maintained by cloud-service providers (e.g., Google Cloud™, Microsoft Azure™, etc.). Additionally, in some instances, transaction system 130 can be incorporated into a single computing system, or incorporated into multiple computing systems.

As described herein, client device 102 may execute a locally maintained application program, such as payment application 108 or a web browser, which may cause client device 102 to generate and render a digital interface for presentation on a corresponding display unit, such as display unit 116A. In some instances, the digital interface may be associated with an exchange of data capable of initiation by the executed application program, and further, may include one or more discrete interface elements that, when populated by data input to client device 102 by user 101 (e.g., via input unit 116B), specify corresponding parameter values of that data exchange. For example, and without limitation, the digital interface may include a discrete interface element, such as a fillable text box, designated to receive an identifier (e.g., a name) of a counterparty to the data exchange, along with additional or alternate interface elements designated to receive other values of parameters that enable the executed application program to initiate the data exchange.

In some exemplary embodiments, and as described herein, transaction system 130 may perform operations that monitor, in real-time, an interaction of user 101 within the generated and presented digital interface based on data exchanged with the executed application program across a secure, programmatic interface, and that detect input data provided by user 101 to certain of the interface elements within the presented digital interface. By way of example, and based on a portion of the exchanged data, transaction system 130 may detect an input by user 101 of a portion of an identifier associated with a counterparty and may perform any of the exemplary processes described herein to determine one or more candidate counterparty identifiers (e.g., "recommended" counterparty identifiers) that are consistent with, associated with, or include the inputted portion of the counterparty identifier.

For instance, and as described herein, one or more of the candidate counterparty identifiers may be consistent with a corresponding preference specified by user 101 or associated with client device 102 (e.g., a counterparty type specified by user 101, or imposed limitation on a length, such as character limitation, associated with a display functionality of client device 102). In other instances, and based on an application of one or more statistical processes, machine learning processes, artificial intelligence models, or other adaptive processes to locally maintained input data, transaction system 130 may perform any of the exemplary processes described herein to determine one or more of the candidate counterparty identifiers that are contextually relevant to prior exchanges of data initiated by user 101 (or involving user 101) and in some instances, other users exhibiting demographic or geographic characteristics similar to those exhibited by user 101. Additionally, or alternatively, transaction system 130 may also perform operations that filter the candidate counterparty identifiers based on a geographic preference associated with user 101 or device 102 or based on a current geographic position of client device 102.

In some instances, transaction system 130 may perform any of the exemplary processes described to provision one or more of the candidate counterparty identifiers to the application program executed by client device 102, e.g., through a secure, programmatic interface. As described herein, client device 102 may receive data identifying the one or more candidate counterparty identifiers, and the executed application program may perform operations that automatically populate, without intervention from user 101, a corresponding portion of the digital interface with the one or more candidate counterparty identifiers, e.g., via a scroll-down menu, a pop-up interface element, etc. Further, and as described herein, transaction system 130 may also perform operations that provide, to the executed application program, additional data characterizing each of the candidate counterparties, e.g., which facilitates an initiation or scheduling of a data exchange involving corresponding ones of the candidate counterparties by the executed application program.

To facilitate a performance of these exemplary processes, transaction system 130 may maintain, within one or more tangible, non-transitory memories, a user database 132, a transaction database 134, a counterparty database 136, and recommendation database 138. By way of example, user database 132 may include data records that identify and characterize one or more users of transaction system 130, e.g., user 101. For example, and for each of the users, the data records of user database 132 may include a corresponding user identifier (e.g., an alphanumeric login credential assigned to user 101 by transaction system 130) and data that uniquely identifies one or more devices associated with or operated by that user (e.g., a unique device identifier, such as an IP address, a MAC address, a mobile telephone number, etc., that identifies client device 102).

Further, the data records of user database 132 may also link each user identifier (and in some instances, the corresponding unique device identifier) to one or more elements of profile information that characterize corresponding ones of the users of transaction system 130, e.g., user 101. By way of example, the elements of profile information that identify and characterize each of the users of transaction system 130 may include, but are not limited to, a full name of each of the users and contact information associated with each user, such as, but not limited to, a mailing address, a mobile number, or an email address. In other examples, the elements of profile data may also include values of one or more demographic characteristics exhibited by or associated with corresponding ones of the users, such as, but not limited to, an age, a gender, a profession, or a level of education characterizing each of the users of transaction system 130.

The elements of profile data may also include, for one or more of the users, preference data that characterizes one or more preferences for receiving recommendations of candidate counterparty identifiers determined by transaction system 130 using any of the exemplary processes described herein (e.g., based on partial input provided to a digital interface generated by an executed application program, such as payment application 108). For example, the preference data may characterize a counterparty-specific preference, such as a preference of user 101 to receive candidate counterparty identifiers associated with one or more specified counterparties, and additionally, or alternatively, with one or specified classes or types of counterparties (e.g., municipal or local utilities, such as gas, water, or electrical utilities, or providers of services, such as cable television, internet access, etc.).

In other instances, the preference data may also include a geographic preference, such as a preference of user 101 to receive candidate counterparty identifiers of counterparties associated with a specified geographic region (e.g., as maintained within corresponding portions of the profile data), or with a current geographic position of user 101 (e.g., as received by transaction system 130 from client device 102, e.g., via positioning unit 117). The disclosed embodiments are, however, not limited to these examples of counterparty-specific and geographic preferences, and in other instances, user database 132 may maintain any additional or alternate elements of preference data appropriate to the users of transaction system 130 and to data exchanges capable of initiation at corresponding network-connected devices.

Further, the profile data maintained within user database 132 for each of the users of transaction system 130 may also include data identifying and characterizing one or more counterparties associated with data exchanges initiated at corresponding network-connected devices during prior temporal intervals, or scheduled for initiation, e.g., individually or on a recurring basis, during future temporal intervals. For example, profile data may specify, for a corresponding one of the initiated or scheduled data exchanges, a corresponding counterparty identifier (e.g., a name, etc.) and values of parameters that characterize the data exchange, each of which may be linked to a corresponding one of a user identifier and/or a device identifier, as described herein.

Referring back to FIG. 1, transaction database 134 may include data records that identify and characterize one or more exchanges of data initiated by, or on behalf of, one or more users of transaction system 130 during prior temporal intervals. For example, and for a corresponding one of the initiated data exchanges, the data records of transaction database 134 may include, but are not limited to, a unique identifier of the initiated data exchange, data that identifies the initiating user or device (e.g., the login credential of user 101 or the device identifier of client device 102), an initiation time or date, and values of one or more parameters that characterize the corresponding one of the initiated data exchanges, as described herein. The disclosed embodiments are, however, not limited these examples of identifying and characterizing data, and in other instances, the data records of transaction database 134 may maintain any additional or alternate information appropriate to one or more of the initiated data exchanges.

In some instances, the data records of counterparty database 136 may identify, and characterize, one or more counterparties involved in exchanges of data initiated or scheduled by corresponding users of transaction system 130. For example, and for each of the counterparties, the data records of counterparty database 136 may include, but are not, a counterparty identifier (e.g., a complete or partial counterparty name, etc.), a location associated with the counterparty (e.g., an address, an associated city, municipality, geographic region, etc.), and data facilitating an initiation of an exchange of data by an application program executed by a device operated by a corresponding user, such as payment application 108 executed by client device 102.

Further, the data records of counterparty database 136 may also include frequency data characterizing each of the one or more counterparties. The frequency data may specify, for each counterparty, a number of discrete data exchanges initiated between that counterparty and users of transaction system 130 and a number of times transaction system 130 provided the identifier of that counterparty as a candidate counterparty identifier (e.g., as a recommended counterparty). As described herein, contextual transaction system 130 may access all of a portion of the frequency data when determining the one or more candidate counterparty identifiers suitable for provisioning to the digital interface generated by client device 102, e.g., using any of the exemplary processes described herein.

Recommendation database 138 may include data records that identify and characterize each individual candidate counterparty identifier, or each set of candidate counterparty identifier, determined and provisioned to network-connected devices operated by corresponding users of contextual transaction system 130. For example, the data records of recommendation database 138 may associate each of the provisioning candidate counterparty identifiers, or each provisioned set of candidate counterparty identifiers, to a corresponding one of a user identifier and/or a device identifier. Further, and as described herein, the provisioning of the one or more candidate counterparty identifiers to a corresponding network-connected device, such as client device 102, may enable an application program executed by that device, such as payment application 108, to initiate or schedule a data exchange involving a counterparty associated with a selected one of the candidate counterparty identifiers.

In some instances, the data records of recommendation database 138 may also link the provisioned candidate counterparty identifiers, or the provisioned sets of candidate counterparty identifiers, to a corresponding identifier of an initiated or scheduled exchange of data (e.g., as maintained in transaction database 134). Further, transaction system 130 may perform any of the exemplary processes described herein to train, or adaptively improve, one or more machine learning processes, artificial intelligence models, or adaptive statistical processes based on corresponding portions of transaction database 134 and linked portions of recommendations database 138.

Referring back to FIG. 1, transaction system 130 may also maintain, within the one or more tangible, non-transitory memories, one or more executable application programs 140, such as, but not limited to, a monitoring engine 142 and a recommendation engine 144. For example, and when executed by transaction system 130, monitoring engine 142 perform operations that receive and parse data characterizing an interaction a user of transaction system 130, e.g., user 101, with a digital interface generated and presented by an application program executed by a corresponding network-connected device, such as payment application 108 executed by client device 102. In some instances, and based on the received and parsed data, monitoring engine 142 may detect a particular element of data provided by user 101 to client device 102 as an input to a particular interface element within the presented digital interface, such as a portion of a counterparty identifier.

Based on the detected portion of the counterparty identifier, recommendation engine 144, when executed by transaction system 130, perform any of the exemplary processes described herein to identify one or more candidate counterparty identifiers that are consistent with the detected portion of the counterparty identifier and additionally, or alternatively, with one or more preferences specified by user 101 or associated with client device 102. For example, and as described herein, executed recommendation engine 144 may operations that identify and characterize the one or more candidate counterparty identifiers based on an application of a machine learning process, an artificial intelligence model, a multivariate analytical process, a deterministic or stochastic statistical processes, or other adaptive processes (or combinations thereof) to information characterizing exchanges of data previously initiated by or involving user 101 and additional users that exhibit demographic or geographic characteristics similar to those exhibited by user 101. Additionally, or alternatively, recommendation engine 144 may also perform operations that filter the candidate counterparty identifiers based on a geographic preference associated with user 101 or device 102 or based on a current geographic position of client device 102, as described herein.

II. Exemplary Computer-Implemented Processes for Automatically Populating Digital Interfaces Based on Dynamically Generated Contextual Data In some embodiments, a network-connected device operating within environment 100, such as client device 102, may perform operations that execute an application program associated with an exchange of data capable of initiation at client device 102. The executed application program may, in some instances, generate a digital interface for presentation on a display unit of the network-connected device, e.g., display unit 116A, and based on user input provided to discrete interface elements presented within the digital interface (e.g., via input unit 116B of client device 102), the executed application program may perform operations that initiate schedule the data exchange in accordance with certain specified parameter values.

As described herein, the exchange of data may include, but is not limited to, a payment transaction, which client device 102 may schedule for initiation in accordance with values of one or more transaction parameters. The payment transaction may, for example, facilitate a payment of an outstanding invoice issued to user 101 by a corresponding vendor (e.g., a counterparty), such as, but not limited to, a monthly credit card invoice issued to user 101 by an issuer of the corresponding credit card account (e.g., American Express™, etc.), or a monthly invoice issued to user 101 by corresponding utility (e.g., an invoice issued by a municipal gas utility, such as Washington Gas™, etc.). The disclosed embodiments are, however, not limited to these examples of payment transactions, in other instances, the exchange of data may correspond to any additional or alternate payment transaction or data exchange, such as, but not limited to, a peer-to-peer (P2P) transaction between user 101 and one or more known or unknown counterparties.

In some instances, to schedule a payment in satisfaction of the monthly credit card bill issued to user 101 by a corresponding counterparty, such as American Express™, user 101 may provide input to client device 102 (e.g., via input unit 116B of FIG. 1) that requests an execution of a corresponding payment application, such as payment application 108 of FIG. 1. For example, upon execution by client device 102, payment application 108 may generate and render one or more interface elements for presentation within a corresponding digital payment interface, e.g., through display unit 116A. In some instances, the digital payment interface may include interface elements that prompt user 101 to provide input to client device 102, via input unit 116B, that specifies a corresponding login credential (e.g., an alphanumeric login credential of user 101) and one or more corresponding authentication credentials (e.g., an alphanumeric password of user 101, a biometric credential of user 101, etc.).

Based on the specified login and authentication credentials, executed payment application 108 may perform operations that authenticate an identity of user 101 based on copies of locally stored login and authentication credentials (e.g., as maintained within corresponding portions of device information 112 and application data 114) or based on data exchanged with one or more network-connected computing systems, such as transaction system 130. In response to a successful authentication of the identity of user 101, executed payment application 108 may perform operations that generate and present, within the digital interface, additional interface elements that prompt user 101 to provide input specifying an identifier of the counterparty involved in the payment transaction, e.g., American Express™.

Figure 2B:
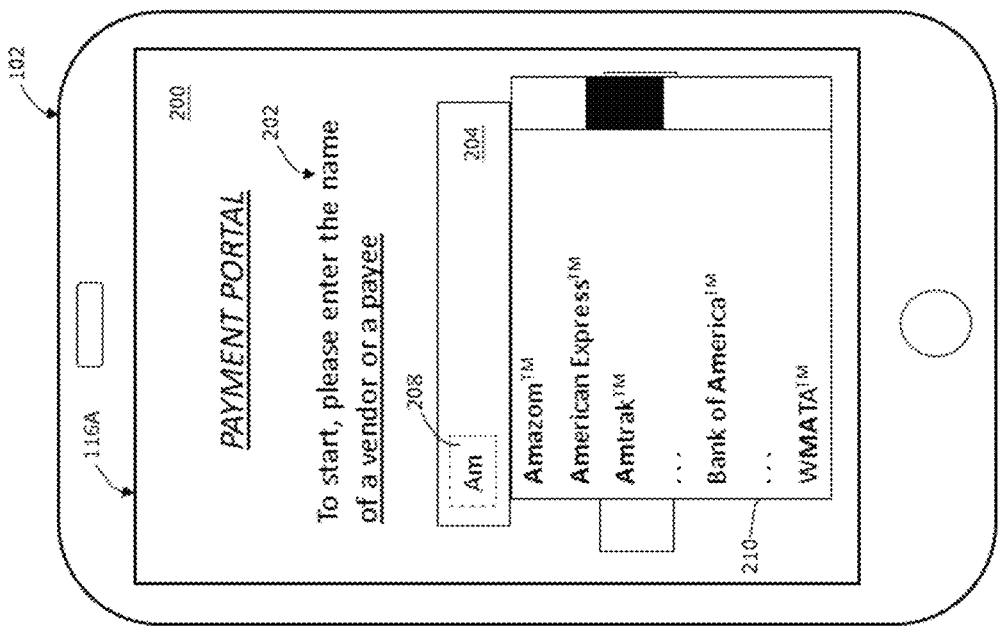
FIGS. 2A and 2B are diagrams illustrating portions of an exemplary graphical user interface, consistent with the disclosed embodiments.
Figure 2A:
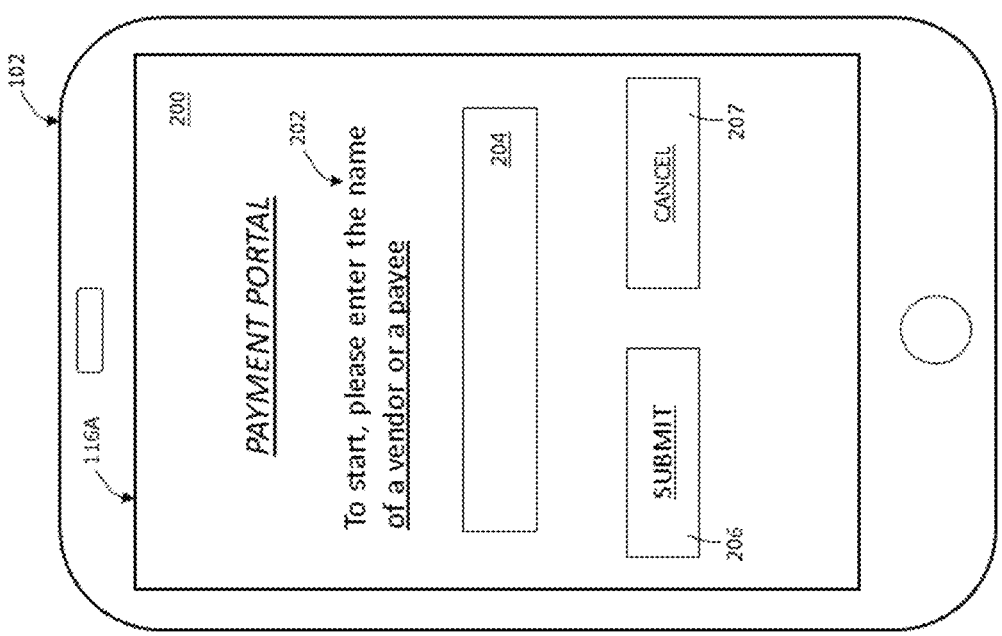

For example, as illustrated in FIG. 2A, executed payment application 108 may perform operations that cause client device 102 to generate and present, on display unit 116A, a digital payment interface 200 that includes interface elements 202, which prompt user 101 to provide input specifying the counterparty identifier (e.g., the name of American Express™) within a corresponding fillable text box 204. Upon entry of the counterparty identifier, user 101 may provide input to client device 102 (e.g., via input unit 116B) that selects icon 206. In response to the selection, executable application program 108 may generate and present further interface elements within digital payment interface 200 (not illustrated in FIG. 2) that prompt user 101 to input values transaction parameters facilitating an initiation, or a future scheduling, of the payment associated with the outstanding American Express™ invoice, e.g., as a single instance or on a recurring basis. In other instances, the further input may select icon 207, which cancels scheduling of the payment transaction.

In many instances, however, client device 102 may correspond to a mobile communications device that includes a display unit and additionally, or alternatively, an input unit, characterized by a limited size or a limited functionality. For example, client device 102 may include a smart phone configured to displayed digital payment interface 200 on a pressure-sensitive, touchscreen display unit, and to receive input data via a miniaturized "virtual" keyboard presented within digital payment interface 200 (not shown in FIG. 2A). In many instances, and to improve an ability of user 101 to input data using such limited-size or limited functionality display and input units, executed payment application 108 may also perform one or more auto-completion operations that generate and present, within a corresponding drop-down list or scroll-down menu, a plurality of candidate counterparty identifiers that are consistent with, or include, a portion of a counterparty identifier provided by user 101 as an input to fillable text box 204.

For example, as illustrated in FIG. 2B, user 101 may provide input to fillable text box 204 (e.g., via input unit 116B of client device 102) that specifies a leading portion 208 of a corresponding counterparty identifier for American Express™, e.g., the text "Am." In some instances, and in response to the detected entry of leading portion 208 (e.g., the text "Am"), executed payment application 108 may perform one or more auto-completion operations that identify character strings provided as prior input to digital payment interface 200 (and additionally or alternatively, to other digital interfaces generated and presented by client device 102), that select a subset of the character strings that include leading portion 208 (e.g., the text "Am"), and that present the selected character strings as candidate counterparty identifiers within a corresponding drop-down list, e.g., drop-down list 210 of FIG. 2B.

By filtering the prior input in accordance with the text of leading portion 208, the auto-completion processes implemented by executed payment application 108 may present candidate counterparty identifiers characterized by various degrees of relevance of the underlying payment transaction and the outstanding invoice. For example, as illustrated in FIG. 2B, these auto-completion processes may propose, as candidate counterparty identifiers within drop-down list 210, character strings having a leading portion consistent with leading portion 208 (e.g., Amazon™, American Express™, and Amtrak™), additional character strings that include ordered textual content consistent with leading portion 208 (e.g., Bank of America™, etc.), and/or further character strings that include permutations of the textual content within leading portion 208 (e.g., WMATA™, etc.). Further, although not illustrated in FIG. 2B, user 101 may provide additional input to client device 102 (e.g., via input unit 116B) that scrolls through drop-down list 210 and selects "American Express™" as the counterparty identifier associated with the payment transaction and the outstanding invoice.

In many instances, certain of these text-based auto-completion processes select a large number of candidate counterparty identifiers for recommendation within drop-down list 210 of digital payment interface 200, especially when the textual content within leading portion 208 includes only a few characters or a simple combination of characters. The length of drop-down list 210, coupled with a requirement to access candidate counterparty identifiers at various positions within drop-down list 210, can often approach or exceed the limited display or input functionalities of many mobile communications devices, such as smart phones or wearable devices or form factors.

In addition, to reduce a length of drop-down list 210, user 101 must often provide a more complex or more complete portion of the counterparty identifier as an input to fillable text box 204, the provision of which may be further limited by the input functionalities of client device 102. Furthermore, should leading portion 208 fail to match any portion of a character string previously provided as an input to digital payment interface 200 (or other digital interface generated and presented by client device 102), certain of these text-based auto-completion processes may fail to return any recommendations, and user 101 may provide additional input to client device 102 that completely specifies the counterparty identifier, e.g., in accordance with the limited input functionality of client device 102.

In some exemplary embodiments, and as described herein, a network-connected computing system, such as transaction system 130, may perform operations that monitor, in real-time, an interaction of user 101 with digital payment interface 200 based on data exchanged with the executed payment application 108 across a secure, programmatic interface, and that detect an input of a portion of the counterparty identifier to fillable text box 204, e.g., leading portion 208 described herein. Based on an application of one or more statistical processes, machine learning processes, artificial intelligence models, or other adaptive processes to locally maintained profile and transaction data, transaction system 130 may perform any of the exemplary processes described herein to select candidate counterparty identifiers that are consistent with one or more preferences of user 101 or a current geographic position of client device 102, and further, that are contextually relevant to prior exchanges of data initiated by user 101 (or involving user 101) and in some instances, other users exhibiting demographic or geographic characteristics similar to those exhibited by user 101. As described herein, transaction system 130 may perform additional operations that provision one or more of the selected counterparty identifiers to executed application program 108, e.g., through a secure, programmatic interface, and executed application program 108 may perform operation that populate automatically digital payment interface 200 with the one or more selected candidate counterparty identifiers, without intervention from user 101.

Certain of these exemplary processes, which determine that a candidate counterparty identifier is not only consistent with a user-input portion of a counterparty identifier and/or a geographic preference of user 101, but is also contextually relevant to prior exchanges of data involving user 101 and in some instances, other users exhibiting demographic or geographic characteristics similar to those exhibited by user 101, can be used in addition to, or as an alternate to, conventional auto-completion processes that obtain candidate counterparty identifier based on a text-filtering of character strings previously input by user 101 to digital interfaces generated and presented by client device 102. In some instances, one or more of these exemplary processes, as described herein, can provision a client device characterized by limited display or input functionalities, such as client device 102, with a reduced number of candidate counterparty identifiers of greater relevance to the payment transaction and the underling invoice, and can reduce a number of discrete input operations required to access and select one of the presented candidate counterparty identifiers for further payment processing. As such, these exemplary processes provide a technical solution that extends beyond conventional auto-completion processes, and improves, or in some instances, establishes, an ability of a user of client device 102 to interface with, and operate, complex digital interfaces using mobile communications devices having limited display or input functionalities.

Figure 3A:
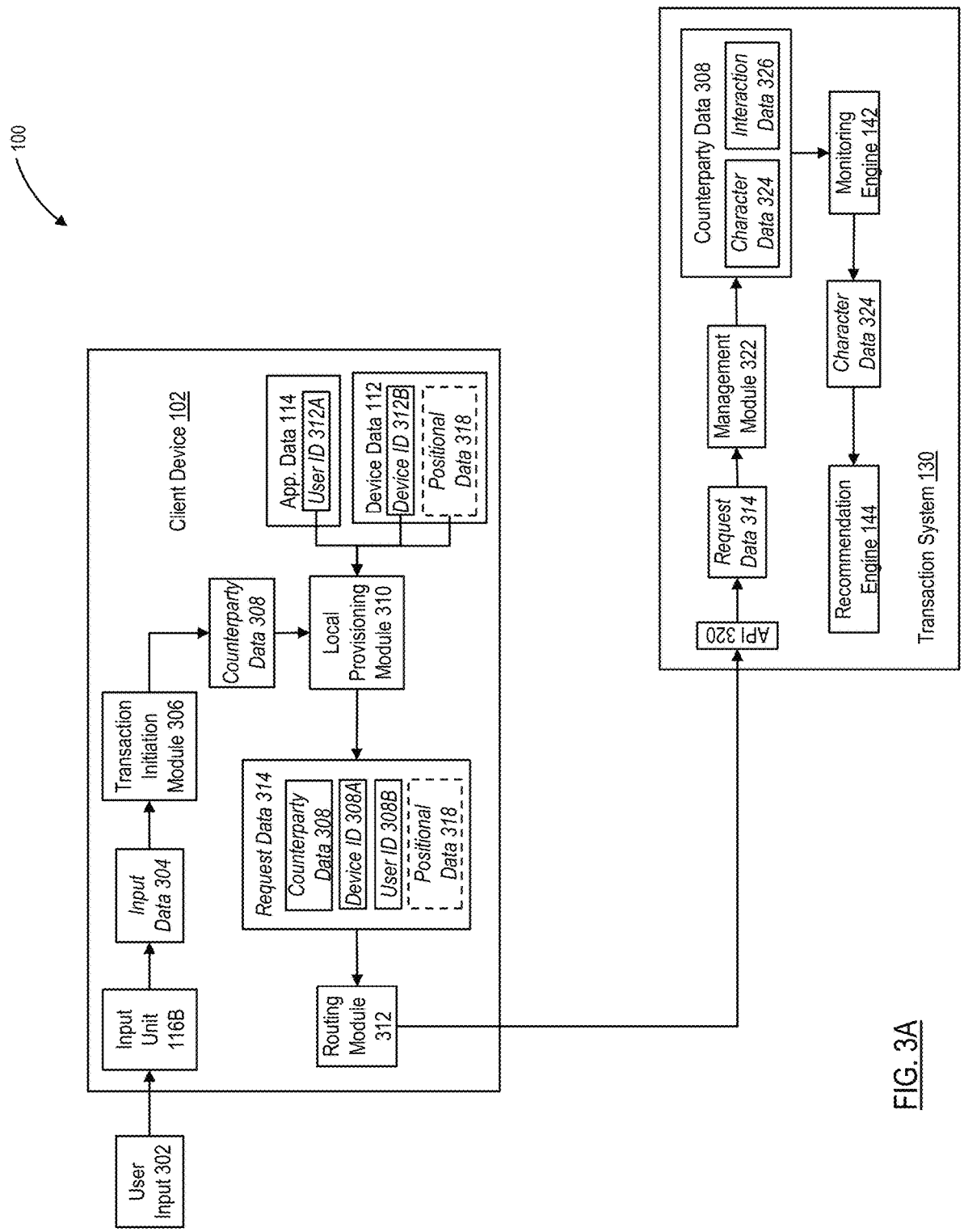
FIGS. 3A, 3B, and 3C are diagrams illustrating portions of an exemplary computing environment, consistent with the disclosed embodiments.

For example, and in reference to FIG. 3A, client device 102 may receive a user input 302 through a corresponding input unit, e.g., input unit 116B of client device 102. In some instances, user input 302 may include a portion of an identifier of a counterparty to a payment transaction, and user 101 may provide the portion of the counterparty identifier as an input to a particular interface element presented within a digital interface associated with the payment transaction, e.g., as an input to fillable text box 204 within digital payment interface 200 of FIGS. 2A and 2B.

In some instances, the received portion of the counterparty identifier may include one or more characters that collectively establish a leading portion, an intermediate portion, or a trailing portion (or any combination thereof) of an identifier of a counterparty to a payment transaction capable of initiation by payment application 108. For example, user input 302 may include all or a portion of leading portion 208 of FIG. 2B, which specifies the text "Am" and corresponds to a portion of counterparty identifier "American Express™." In other examples, user input 302 may include a leading portion of any additional or alternate counterparty identifier, such as the text "Was," which corresponds to a leading portion of the counterparty identifier for "Washington Gas" (e.g., municipal gas utility servicing Washington, D.C.). Further, user input 302 may also include an intermediate portion of a counterparty identifier (e.g., the text "eln," which corresponds to an intermediate portion of the counterparty identifier for loan servicer "Nelnet™") and/or a trailing portion of a counterparty identifier (e.g., the text "xon," which corresponds to the trailing portion of the counterparty identifier for "Exxon™").

In other instances, user input 302 need not include any portion of the counterparty identifier and may instead specify a nickname associated with a particular counterparty. For instance, and for a payment transaction involving a monthly invoice issued by the "Washington Capitals" hockey club, received user input 302 may include the text "Caps™," which corresponds to a nickname of the "Washington Capitals™." The disclosed embodiments are, however, not limited to these exemplary elements of textual content, and in other instances, received user input 302 may include any additional or alternate combination of characters capable of representing or identifying all or a portion of an identifier of one or more counterparties.

Referring back to FIG. 3A, input unit 116B may receive user input 302, and route input data 304, which includes the portion of the counterparty identifier, to a transaction initiation module 306 of executed payment application 108. In some instances, not illustrated in FIG. 3A, input data 304 may also include interaction data characterizing an interaction of user 101 with corresponding portions of the digital payment interface, e.g., digital payment interface 200, during a provision of input data to client device 102. For example, and as described herein, user 101 may provide the portion of counterparty identifier as an input to a particular interface element presented within the digital payment interface, e.g., and the interaction data may identify or characterize the particular interface element, such as, but not limited to, a spatial position of a boundary of fillable text box 204 within digital payment interface 200. Further, in some instances, the interaction data may also include additional information, such as metadata, that links the particular interface element to the counterparty identifier, or other information that characterizes an interaction of user 101 with that particular elements.

Transaction initiation module 306 may perform operations that parse input data 304 to extract the one or more characters representing the portion of the counterparty identifier (e.g., "Am," "Wa," "xon," etc.) and further, to extract the interaction data characterizing the entry of the one or more characters into the digital payment interface (e.g., into fillable text box 204 within digital payment interface 200). Further, transaction initiation module 306 may perform operations that package the one or more extracted characters into a corresponding portion of counterparty data 308, along with corresponding elements of the interaction data. Transaction initiation module 306 may also provide counterparty data 308 as an input to a local provisioning module 310 of executed payment application 108.

As described herein, user input 302 may include textual content, e.g., the one or more extracted characters, provided as input to a portion of a digital payment interface generated executed payment application 108 (e.g., into fillable text box 204 of digital payment interface 200). For example, user 101 may establish contact between a finger or stylus and a portion of a surface of display unit 116A (e.g., a surface of a pressure-sensitive, touchscreen display) that corresponds to fillable text box 204. In response to the established contact, client device 102 may perform operations that generate and present a virtual keyboard on display unit 116A, and user 101 may provide input to the virtual keyboard that specifies the one or characters, as described herein.

In other instances, and consistent with the disclosed exemplary embodiments, user input 302 may include audio content representative of a portion of a counterparty identifier uttered by user 101 and captured by a corresponding microphone embedded into client device 102 (e.g., as a portion of input unit 116B) or in communication with client device 102 (e.g., across a short-range communications channel, such as Bluetooth™, etc.). Transaction initiation module 306 may receive and extract the audio content from input data 304 and based on an application one or more speech recognition algorithms or natural-language processes algorithms to the extracted audio content, convert the audio content into corresponding text. Further, transaction initiation module 306 may perform any of the exemplary processes described herein to establish that the converted textual content corresponds to the portion of the counterparty identifier, to package the converted textual content into the corresponding portion of counterparty data 308, and to provide counterparty data 308 as an input to local provisioning module 310.

Referring back to FIG. 3A, local provisioning module 310 may receive counterparty data 308, and may perform operations that access application data 114 (e.g., as maintained within data repository 110) and extract user data 312A, which includes the user identifier of user 101 (e.g., the alphanumeric login credential of user 101, etc.). Local provisioning module 310 may also access device information 112 (e.g., as also maintained within data repository 110) and extract device data 312B, which includes the device identifier of client device 102 (e.g., a network identifier of client device 102, such as an IP address or a MAC address). In some instances, local provisioning module 310 may perform operations that package counterparty data 308, user data 312A and in some instances, device data 312B, into corresponding portions of request data 314, which local provisioning module 310 may provide as an input to a routing module 316 of client device 102.

In further instances, request data 314 may include information that identifies or characterizes a current geographic position of client device 102. For example, one or network-connected computing systems, such as transaction system 130, may process device data 312B and determine a current geographic position of client device 102, e.g., based on the IP address of client device 102. In other examples, illustrated in FIG. 3A, local provisioning module 310 may also extract, from the accessed portions of device information 112, positional data 318 that specifies a current geographic position of client device 102, e.g., as captured by positioning unit 117, and a time or date at which positioning unit 117 captured the current geographic position. Further, although not illustrated in FIG. 3A, execute payment application 108 may perform additional, or alternate operations that cause client device 102 to generate and transmit the current geographic position of client device 102, along with the time or date of captured, across network 120 to transaction system 130, e.g., at predetermined intervals or in response to a detection of a triggering event (e.g., a "push" operation), or in response to a request programmatic transmitted by transaction system 130 (e.g., a "pull" operation).

As illustrated in FIG. 3A, routing module 316 may receive request data 314, and may perform operations that extract, from a tangible, non-transitory memory, a unique network address associated with transaction system 130. Routing module 316 may perform additional operations that cause client device 102 to transmit request data 314 across network 120 to transaction system 130, e.g., using any appropriate communications protocol.

A secure programmatic interface of transaction system 130, e.g., application programming interface (API) 320, may receive and route request data 314 to a management module 322 executed by transaction system 130. API 320 may be associated with or established by management module 322, and may facilitate secure, module-to-module communications across network 120 between management module 322 and routing module 316 of client device 102. As described herein, request data 314 may include counterparty data 308 (e.g., which includes the one or more characters that correspond to the specified portion of the counterparty identifier and the interaction data), along with user data 312A (e.g., which includes the unique identifier of user 101) and in some instances, device data 312B (e.g., which includes the unique network address of client device 102) and/or positional data 318 (e.g., which includes the current geographic position of client device 102). In some instances, management module 322 may perform operations that store request data 314 within one or more tangible, non-transitory memories, and may provide counterparty data 308 as an input to a monitoring engine 142 of transaction system 130.

In some instances, when executed by transaction system 130, monitoring engine 142 may perform operations that process counterparty data 308 to extract character data 324, which includes the one or more characters provided as inputs to the digital payment interface (e.g., digital payment interface 200 of FIGS. 2A and 2B), and to extract interaction data 326, which characterizes the entry of the one or more characters into a particular interface element within the digital payment interface. Based on portions of extracted character data 324 and interaction data 326, monitoring engine 142 may perform operations that detect the input of the one or more characters into the particular interface element presented within the digital payment interface, e.g., into fillable text box 204 of digital payment interface 200. Further, and based on portions of extracted interaction data 326, monitoring engine 142 may further establish that the particular interface element (e.g., fillable text box 204) is designated to receive the counterparty identifier within the digital payment interface (e.g., digital payment interface 200), and may determine that the one or more characters represent a portion of a counterparty identifier.

Based on the determination that the one or more characters represent the portion of the counterparty identifier, monitoring engine 142 may perform operations that provide character data 324 as an input to recommendation engine 144 of transaction system 130. Based on portions of locally maintained user database 132, transaction database 134, and counterparty database 136, recommendation engine 144 may, upon execution by transaction system 130, perform any of the exemplary processes described herein to determine and select one or more candidate counterparty identifiers that are consistent with the one or more characters specified within character data 324, that are consistent with one or more counterparty-specific or geographic preferences of user 101, and additionally, or alternatively, that are contextually relevant to prior payment transactions involving user 101 and in some instances, other users exhibiting demographic or geographic characteristics similar to those exhibited by user 101.

Figure 3B:
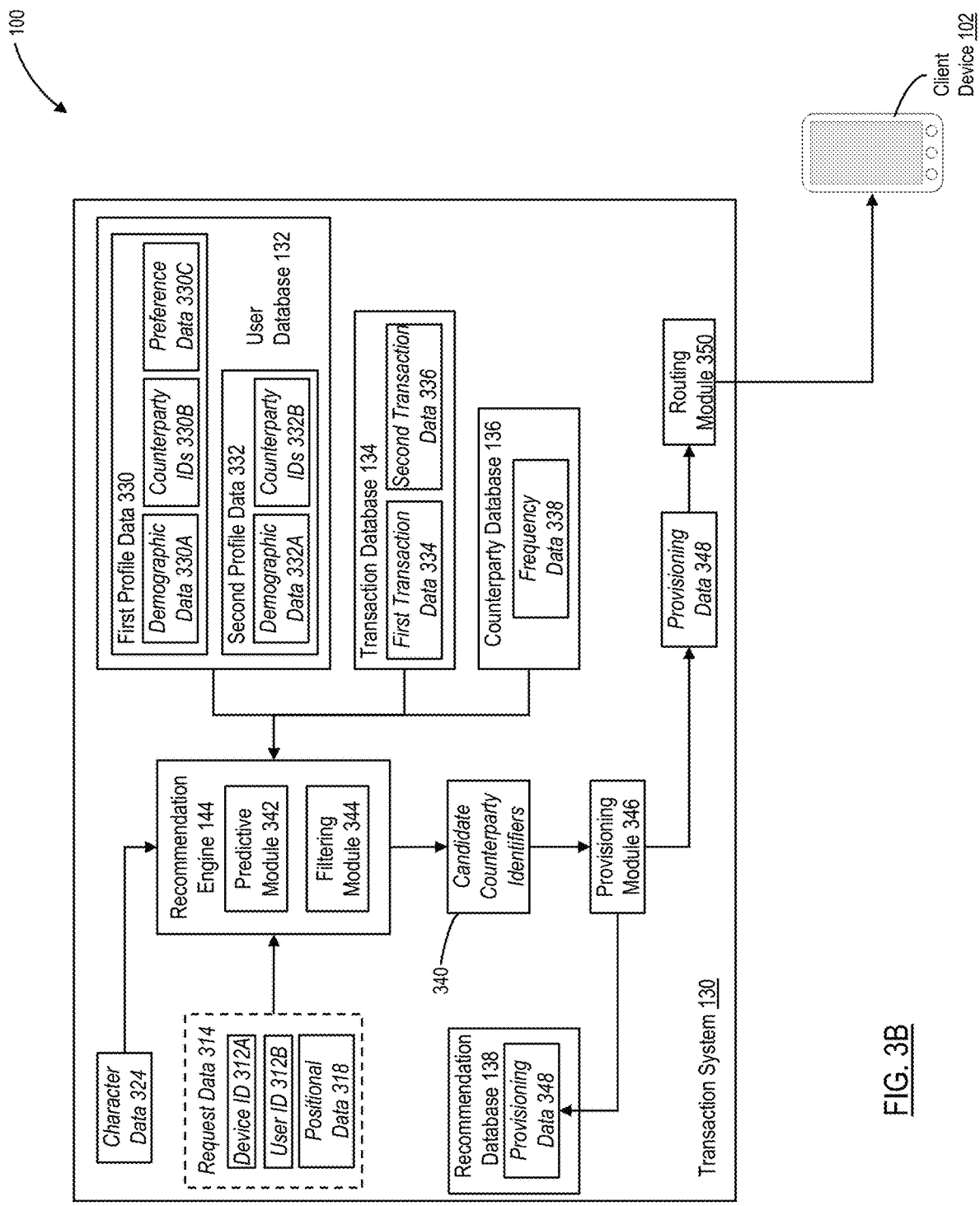

By way of example, and in reference to FIG. 3B, recommendation engine 144 may receive character data 324, which includes the one or more characters that establish the portion of the counterparty identifier provided as an input to client device 102 by user 101. Recommendation engine 144 may also perform operations that access request data 314, e.g., as maintained within the one or more tangible, non-transitory memories, and extract user data 312A that includes the user identifier of user 101 (e.g., the alphanumeric login credential of user 101, etc.), and in some instances, device data 312B that includes the device identifier of client device 102 (e.g., the network identifier of client device 102) and/or positional data 318 that specifies the current geographic position of client device 102.

Recommendation engine 144 may also access user database 132 and identify and extract first profile data 330 that includes, or references, user data 312A (e.g., the login credential of user 101) or device data 312B (e.g., the network address of client device 102) and as such, that identifies and characterizes user 101. In some instances, first profile data 330 may include one or more data records that specify a full name of user 101, contact information for user 101 (e.g., a mobile telephone number or email address), and positional information associated with user 101, such as a home address or a corresponding specified geographic region. Further, first profile data 330 may include first demographic data 330A, first counterparty identifiers 330B, and preference data 330C associated with user 101. For example, first demographic data 330A may specify values of one or more demographic characteristics exhibited by or associated with user 101, such as, but not limited to, an age, a gender, a profession, or a level of education of user 101.

In some instances, first counterparty identifiers 330B may identify one or more counterparties to corresponding payment transactions initiated by user 101 during prior temporal intervals, or scheduled for initiation, e.g., individually or on a recurring basis, during future temporal intervals. Further, and as described herein, preference data 330C may that characterizes one or more preferences of user 101 for receiving recommendations of candidate counterparty identifiers determined by transaction system 130 using any of the exemplary processes described herein.

For example, preference data 330C may characterize a counterparty-specific preference, such as a preference of user 101 to receive candidate counterparty identifiers associated with one or more specific counterparties, and additionally, or alternatively, with one or specified classes or types of counterparties (e.g., a local electrical utility or a local gas utility, etc.). Preference data 330C may also characterize a geographic preference, such as a preference of user 101 to receive candidate counterparty identifiers associated with one or more specific counterparties associated with a particular geographic region that includes the current geographic position of client device 102, or being associated with a corresponding geographic position that falls within a threshold distance of the corresponding geographic position.

Further, as illustrated in FIG. 3B, recommendation engine 144 may identify and extract, from user database 132, second profile data 332 that identifies and characterizes one or more additional users of transaction system 130. By way of example, and as described herein, the data records of second profile data 332 may specify a full name, contact information, and positional information (e.g., the home address, the corresponding geographic region, etc.) for each of the additional users. The data records of second profile data 332 may also specify, for each of the additional users, corresponding elements of second demographic data 332A and second counterparty identifiers 332B. In some instances, second demographic data 332A may specify values of one or more of the demographic characteristics that are exhibited by each of the additional users, and second counterparty identifiers 332B may identify one or more counterparties to corresponding payment transactions initiated by each of the additional users during prior temporal intervals, or scheduled for initiation, e.g., individually or on a recurring basis, during future temporal intervals.

Additionally, in some instances, recommendation engine 144 may also access transaction database 134, and extract first transaction data 334, which identifies and characterizes payment transactions involving user 101 during one or more prior temporal intervals, and second transaction data 336, which identifies and characterizes prior payment transactions involving one or more additional users of transaction system 130 during the prior temporal intervals. For example, each of the data records of first transaction data 334 include, or reference, user data 312A (e.g., the login credential of user 101) or device data 312B (e.g., the network address of device 102), and specify values of parameters characterizing a corresponding payment transaction involving user 101 during the prior temporal intervals.

Further, and for each of the additional users, the data records of second transaction data 336 include or reference elements of corresponding user or device data and specify additional values of parameters characterizing corresponding payment transactions involving that additional user during the prior temporal intervals. As described herein, the parameter values specified within each of first transaction data 334 and second transaction data 336 include, but are not limited to, a corresponding counterparty identifier (e.g., a counterparty name, etc.), account data associated with the corresponding counterparty identifier (e.g., an actual or tokenized account number, routing number, etc.), and a transaction date or time, and/or a transaction value.

In additional instances, illustrated in FIG. 3B. recommendation engine 144 may also perform operations that access counterparty database 138, and identify and extract frequency data 338 that characterizes, among other things, a frequency at which users of transaction system 130, such as user 101, initiate payment transactions involving one or more counterparties, or frequency at which transaction system 130 identifies one or more of the counterparties for provisioning to client device 102 as a candidate counterparty, e.g., using any of the processes described herein. For example, frequency data 338 may include aggregate data, which identifies an aggregate number of initiated transactions, or an aggregate number of recommendations, involving the one or more counterparties. In other instances, and consistent with the disclosed exemplary embodiments, frequency data 338 may specify a more granular measure of frequency, and may characterize a number of initiated transaction, or a number of recommendations, for a particular counterparty, such as American Express™ or Washington Gas™, on a user-specific basis.

Referring back to FIG. 3B, recommendation engine 144 may receive positional data 318 (e.g., specifying the current geographic position of client device 102), character data 324 (e.g., specifying the one or more characters input into the digital payment interface), first and second profile data 330 and 332, first and second transaction data 334 and 336, and/or frequency data 338, which correspond to obtained and aggregated elements of input data. Based on one or more of these elements of input data, recommendation engine 144 may perform any of the exemplary processes described herein to determine and select one or more candidate counterparty identifiers that are consistent with positional data 318 and/or the one or more characters specified within character data 324, that are consistent with one or more counterparty-specific or geographic preferences of user 101, and additionally, or alternatively, that are contextually relevant to prior payment transactions involving user 101 and in some instances, other users exhibiting demographic or geographic characteristics similar to those exhibited by user 101.

Recommendation engine 144 may generate output data, e.g., output data 340, that includes each of the selected candidate counterparty identifiers. In some instances, and recommendation engine 144 may perform also perform operations that rank, within output data 340, each of the selected candidate counterparty identifiers in accordance with a likelihood that user 101 will schedule a payment transaction involving the corresponding counterparty during a future temporal interval, e.g., based on a predictive analysis of first and second profile data 330 and 332, first and second transaction data 334 and 336, and/or frequency data 338 using any of the exemplary processes described herein. Further, and in additional, or alternate, examples, output data 340 may also include, for each of the selected candidate counterparty identifiers, a computed metric, e.g., a relevance score, indicative of a relevance of that selected candidate counterparty identifier to character data 324 and additionally, or alternatively, to positional data 318, e.g., as computed using any of the predictive processes described herein.

For example, as illustrated in FIG. 3B, recommendation engine 144 may include a predictive module 342 that, upon execution by client device 102, receives one or more of the elements of input data described herein, and performs operations that apply one or more machine learning processes, one or more deterministic or stochastic statistical processes, one or more artificial neural network models, or other adaptive processes to the received elements of input data. Based on the application of the one or more these processes or models to corresponding portions of the elements of input data, filtering module 344 may perform operations that determine one or more candidate counterparty identifiers that are consistent with character data 324 and further, are associated with counterparties relevant to the prior payment transactions involving user 101 (e.g., as specified within first profile data 330 or first transaction data 334) and in some instances, to other users exhibiting demographic or geographic characteristics similar to those exhibited by user 101 (e.g., as specified within second profile data 332 or second transaction data 336).

Examples of the one or more machine learning processes or adaptive processes applied by predictive module 342 include one or more collaborative filtering algorithms, such as, but one limited to, a memory-based algorithm, a model-based algorithm, or a hybrid algorithm capable of implementing user- or item-based collaborative filtering based on elements of first and second profile data 330 and 332 and of first and second transaction data 334 and 336. In other instances, machine learning algorithms and adaptive processes consistent with the disclosed embodiments include, but are not limited to, an association-rule algorithm (such as an Apriori algorithm, an Eclat algorithm, or an FP-growth algorithm) or a clustering algorithm (such as a hierarchical clustering module, a k-means algorithm, or other statistical clustering algorithms). Further, examples of the artificial intelligence models include, but are not limited to, an artificial neural network model, a recurrent neural network model, a Bayesian network model, or a Markov model.

Additionally, in some instances, examples of the deterministic or stochastic statistical algorithms or processes applied by predictive module 342 may include, but are not limited to, a multivariate analytical process, such as a matrix factorization algorithm (e.g., a non-negative matrix factorization algorithm, a sparse matrix factorization algorithm, etc.), or a supervised machine learning algorithm, such as a support vector machine (SVM) model. Additional examples of these deterministic or stochastic statistical algorithms or processes include, but are not limited to, a linear or non-linear regression algorithm, a multiple regression algorithm, a least absolute selection shrinkage operator (LASSO) regression algorithm, or a logistic regression algorithm.

The disclosed embodiments are, however, not limited to these exemplary machine learning processes, deterministic or stochastic statistical algorithms, artificial intelligence models, or other adaptive processes, and in other instances, predictive module 342 may apply any additional or alternate adaptive, deterministic, or stochastic process to portions of the input data described herein to determine one or more candidate counterparty identifiers that are consistent with positional data 318 and/or character data 324, and additionally, or alternatively, that are contextually relevant to prior payment transactions involving user 101 and in some instances, other users exhibiting demographic or geographic characteristics similar to those exhibited by user 101. Further, and as described herein, one or more of these exemplary machine learning processes, artificial intelligence models, deterministic or stochastic statistical algorithms or processes, and adaptive processes, may be trained against, and adaptively improved using, certain portions of transaction database 134, which identifies and characterizes payment transactions initiated by users of transaction system 130 during prior temporal intervals, and portions of recommendations database 138, which identifies candidate counterparties previously recommended to these users and links these recommended candidate counterparty identifiers to corresponding ones of the initiated payment transactions.

By way of example, and using any of the processes described herein, predictive engine 142 may identify counterparties involved in payment transactions initiated by user 101 during one or more prior temporal intervals (e.g., based on first counterparty data 330B of first profile data 330 or based on first transaction data 334) and additionally, or alternatively, scheduled for future or recurring initiation (e.g., based on first counterparty data 330B of first profile data 330). In some instances, and based on any of the machine learning processes, artificial intelligence models, deterministic or stochastic statistical processes, or other adaptive algorithms to the information characterizing these identified counterparties, and to portions of frequency data 338 associated with these identified counterparties, predictive module 342 may determine that the counterparty identifiers associated with one or more of these counterparties are consistent with, or relevant to, the one or more characters input into the digital payment interface, e.g., as set forth in character data 324.

Based on an outcome of these adaptive, stochastic, or deterministic processes, predictive module 342 may select the consistent and/or relevant ones of the counterparty identifiers (e.g., associated with the one or more identified counterparties) as candidate counterparty identifiers for recommendation to client device 102 using any of the exemplary processes described herein. Additionally, or alternatively, predictive module 342 may also process the selected counterparties identifiers to identify, or prioritize, one or more of the selected counterparty identifiers characterized by geographic locations (e.g., places of business of the underlying counterparties, etc.) that are disposed within a threshold distance of the current geographic position of user 101 or client device 102, e.g., as specified within positional data 318. In other instances, predictive module 342 may perform operations that identify, or prioritize, one or more of the selected counterparty identifiers that are associated with corresponding counterparties located in a city, town, or other geographic region that includes the current geographic position of user 101 or client device 102, and/or that prioritize one or more of the selected counterparty identifiers that correspond to online merchants or retailers.

In further examples, and using any of the processes described herein, predictive engine 142 may also identify additional counterparties that are relevant to payment transactions involving users that exhibit demographic or geographic characteristics similar to those exhibited by user 101. For instance, and based on a demographic data 330A (e.g., within first profile data 330), predictive module 342 may establish that user 101 corresponds to a forty-year-old male attorney residing in Washington, D.C., and that user 101 holds multiple post-graduate and professional degrees. As described herein, predictive module 342 may apply one or more of the collaborative filtering algorithms, the artificial intelligence models, or the multivariate statistical processes to portions of the demographic and geographic parameters that characterize user 101, to demographic data 332A that characterizes the other users of transaction system 130, and further to portions of frequency data 338 and additional data records of counterparty database 136 that specify counterparty locations.

Based on the application of these collaborative filtering algorithms, the artificial intelligence models, or the multivariate statistical processes, predictive module 342 may perform operations that establish a contextual relevance of one or more of the additional counterparties to initiated or scheduled payment transactions involving other users that exhibit demographic or geographic characteristics similar to those exhibited by user 101, e.g., the forty-year-old male attorney residing in Washington, D.C., and that select an identifier of each of the one or more additional counterparties for provisioning to the digital payment interface presented by client device 102. In some instances, the one or more additional counterparties may represent counterparties that are frequently involved in payment transactions scheduled or initiated by one or more of the demographically or geographically similar users of transaction system 130, and predictive module 342 may establish that a counterparty represents a "frequently involved" counterparty when that counterparty in involved in an aggregate number of scheduled or initiated payment transactions that exceeds a first threshold value and additionally, or alternatively, when a corresponding one or the demographically or geographically similar other users initiated or scheduled greater than a second threshold number of payment transactions involving that counterparty.

In some examples, and to identify all or a portion of the similar users, predictive module 342 may perform operations that generate, for each user of transaction system 130, a vector representation parameterized by corresponding elements of demographic or geographic data (e.g., as maintained within demographic data 330A and/or 332B) and corresponding elements of transaction data (e.g., as maintained within first transaction data 334 and/or second transaction data 336). For example, and for a corresponding one of the users, such as user 101, predictive module 342 may perform operations that apply one or more Doc2Vec™ algorithms to corresponding portions of demographic data 330A and demographic data 330A, which generates the vector representation of user 101's spending habits.

Further, predictive module 342 may compute a similarity metric, such as, but not limited to, a cosine similarity, between the vector representation of user 101's spending habits and each of the vector representations of the other users' spending habits, and may establish that one or more of the other users as "similar" to user 101 when their corresponding cosine similarities exceeds a threshold similarity value. Additionally, or alternatively, predictive module 342 may also establish that a threshold number of the other users, e.g., associated with the highest cosine similarities, are demographically similar to user 101 and/or exhibit similar spending habits. In some examples, predictive module 342 may identify one or more additional counterparties involved in payment transactions with these "similar" users, and obtain a candidate counterparty identifier of each of the additional counterparties for provisioning to the digital payment interface presented by client device 102.

As described herein, one or more of the additional counterparties may be associated with geographic locations (e.g., as specified within corresponding data records of counterparty database 136) that fall within a threshold distance of the current geographic position of user 101 or client device 102, e.g., as specified within positional data 318. In other instances, one or more of the additional counterparties may be located in a city, town, or other geographic region that includes the current geographic position of user 101 or client device 102. Additionally or alternatively, the additional counterparties may also include an "online" counterparty lacking a physical retain location, such as an electronic or digital merchant.

In other instances, a data record associated with a particular one of the additional counterparties, e.g., as maintained within counterparty database 136, may not specify a counterparty location, or may specify an incomplete or partial counterparty location. By way of example, and for the particular one of the additional counterparties, the data record may specify a state, but may not specify a corresponding city or town within that state. In some example, and based on the missing or incomplete counterparty location, predictive module 342 may perform any of the exemplary processes described herein to predict a counterparty location for the particular one of the additional counterparties based on a predictive analysis of the locations of similar counterparties involved in initiated or scheduled payment transactions with user 101, or with the other users that exhibit demographic or geographic characteristics similar to those exhibited by user 101.

For example, to predict the counterparty location for the particular one or the additional counterparties, predictive module 342 may perform operations that access transaction data characterizing discrete payment transactions involving user 101 and corresponding counterparties, which include, but are not limited to, the particular additional counterparty, e.g., as maintained within transaction database 134. Predictive module 342 may perform further operations that, based on the accessed transaction data, generate a vector representation of the payment transactions involving each of the corresponding counterparties (e.g., one or more representation or a feature vectors generated based on an application of a Word2vec™ algorithm to corresponding portions of the transaction data). Further, predictive module 342 may compute a similarity metric, such as, but not limited to, a cosine similarity, between the vector representation of the particular additional counterparty and each of the vector representations of the other counterparties. Based on the computed similarity metrics, predictive module 342 may perform additional operations that determine the counterparty location for the particular additional counterparty, e.g., based on a counterparty location of the other counterparty characterized by a maximum cosine similarity, or based on counterparty location associated with a majority of the other, similar counterparties.

Further, and based on the application of these collaborative filtering algorithms, the artificial intelligence models, or the multivariate statistical processes, predictive module 342 may perform operations that compute, for each of these additional candidate counterparty identifiers, a corresponding metric indicative of the relevance of that additional candidate counterparty identifier to the one or more characters input into the digital payment interface (e.g., as set forth in character data 224) and further, to contextual information characterizing user 101 or device 102 (e.g., the current geographic position of client device 102, as specified within positional data 318). In some instances, one or more of these additional counterparties, and the selected additional counterparty identifiers, may not be involved in any payment transaction scheduled or initiated by user 101 during a prior temporal interval (e.g., using digital payment interface 200 of FIG. 2A or 2B). In other instances, however, at least one of these additional counterparties, and the at least one corresponding counterparty identifiers, may be involved in one or more corresponding payment transaction scheduled or initiated by user 101.

As described herein, the relevance score for a corresponding one of the candidate counterparty identifiers may be indicative of a relevance of that candidate counterparty identifier to the one or more characters input into the digital payment interface (e.g., as set forth in character data 224) and further, to contextual information characterizing user 101 or device 102 (e.g., the current geographic position of client device 102, as specified within positional data 318). The relevance score may, for example, correspond to a numerical value ranging from zero (e.g., minimal relevance) to unity (e.g., maximum relevance). For instance, the relevance score for a candidate counterparty identifier associated with a "frequently involved" counterparty (e.g., as described herein) may exceed the relevance score for another counterparty identifier associated with a counterparty that is involved in infrequently scheduled or initiated payment transactions. Further, the relevance score for a counterparty identifier that is consistent with one or more characters specified with character data 324 and with the current geographic position of client device 102 may also exceed the relevance score for another counterparty identifier that is inconsistent with the one or more characters specified within character data 324, or that is inconsistent with the current geographic position of client device 102.

In one example, predictive module 342 may perform operations that package the candidate counterparty identifiers (and in some instances, the corresponding relevance scores) into a portion of output data 340, which recommendation engine 144 may provide as an input to a provisioning module 346 of transaction system 130. In other examples, and prior to generating output data 340, predictive module 342 may route all or a portion of the selected candidate counterparty identifiers (and in some instances, the corresponding relevance scores) to a filtering module 344, which when executed by transaction system 130, may filter the candidate counterparty identifiers in accordance with one or more counterparty-specific or geographic preferences of user 101, and additionally, or alternatively, may apply one or more textual or geographic filtering schemes to the candidate counterparty identifiers.

For instance, and in response to an entry of the characters "Wa" into the digital payment interface (e.g., as specified within character data 324), predictive module 342 may perform any of the exemplary processes described to select candidate counterparty identifiers associated with corresponding ones of "Washington Gas™," "Washington Post™," "Washington Capitals," "Wall Street Journal," "Washington Mutual Insurance," "Wells Fargo," and "Willard Intercontinental Hotel," and to generate corresponding relevance scores of 0.95, 0.9, 0.5, 0.8, 0.2, 0.3, and 0.1, respectively. In some examples, filtering module 344 may receive the selected candidate counterparty identifiers and their corresponding relevance scores (e.g., as part of structured or unstructured data), and access preference data 330C maintained within first profile data 330 and one or more data records within counterparty database 136 that include the selected candidate counterparty identifiers.

As described herein, preference data 330C may include one or more counterparty-specific or geographic preferences associated with user 101 (e.g., as specified within an initial registration process between client device 102 and transaction system 130. Further, the accessed data records of counterparty database 136 may specify, for each of the selected candidate counterparty identifiers, data characterizing a location (e.g., a location of a headquarters, physical retailer, customer service center, etc.) and a counterparty type or class, such as a merchant, utility, data provider, sports team, etc.

In some instances, preference data 330C may include information specifying a preference of user 101 to receive recommended counterparty identifiers associated with corresponding counterparties having a physical presence within a specified geographic region, such as the Washington, D.C., metropolitan area. Based on this specified preference, and on corresponding portions of the accessed data records of counterparty database 136, filtering module 344 may perform operations that determine counterparties associated with identifiers "Wall Street Journal" and "Washington Mutual Insurance" lack a physical presence within the Washington, D.C., metropolitan area (e.g., that these counterparties lack any retail location, headquarters, customer service center, etc.), and as such, that these candidate counterparties should filtered from the received set of candidate counterparty identifies and should be excluded from provisioning to client device 102 using any of the processes described herein.

In other instances, preference data 330C may include information specifying an additional, or alternate, preference of user 101 to receive recommended counterparty identifiers associated with municipal utility operating in the Washington, D.C., metropolitan area. Based on this additional, or alternate, preference, and on corresponding portions of the accessed data records of counterparty database 136, filtering module 344 may perform operations that exclude each of the selected candidate counterparties from provisioning to client device except the identifier of "Washington Gas™," which correspond a gas utility servicing Washington, D.C., and its suburbs.

In other examples, filtering module 344 may apply one or more predetermined filtration schemes to the candidate counterparty identifiers (e.g., as selected by predictive module 342 using any of the exemplary processes described herein). For instance, the one or more predetermined filtration schemes may include a textual filtration scheme specifying that each candidate counterparty identifier selected by recommendation engine 144 include a case-specific combination of the characters specified within character data 324 (e.g., the specified, case-specific combination of "Wa"), or include a the specified combination or a permutation of that combination (e.g., e.g., the specified combination of "Wa," of permutations that include "wa" or "aw"). In still further instances, the textual filtration scheme may also specify that each of the specified candidate counterparties include at least a threshold number of the specified characters.

The one or more predetermined filtrations schemes may include a geographic filtration scheme specifying, among other things, that each of the selected candidate counterparty identifiers be associated a corresponding counterparty having a physical presence within a geographic region that includes the current geographic location of client device 102 (e.g., as specified within positional data 318), and additionally or alternatively, that the physical presence of the corresponding counterparty fall within a threshold distance of the current geographic position of client device 102. The disclosed embodiments are, however, not limited to these examples of textual or geographic filtration schemes, and in other instances, filtering module 344 may apply any additional or alternate textual or geographic filtration scheme, or any other filtration scheme, that would be appropriate to the one or more characters specified within character data 324 and to payment application 108 executed by client device 102.

In some instances, recommendation engine 144 may perform operations that package the filtered candidate counterparty identifiers, as generated by filtering module 344, into corresponding portions of output data 340 (and in some instances, along with each of the respective relevance scores). By way of example, and based on the application of the case-specific textual filtration scheme described herein to the candidate counterparty identifiers selected by predictive module 342, filtering module 344 may perform operations that generate a set of filtered candidate counterparty identifiers (e.g., "Washington Gas™," "Washington Post™," "Washington Capitals," "The Wall Street Journal," and "Washington Mutual Insurance") having corresponding relevance scores (e.g., 0.95, 0.9, 0.5, 0.8, 0.2). Recommendation engine 144 may then package the filtered candidate counterparty identifiers (and in some instances, each of the respective relevance scores) into output data 340, which recommendation engine 144 may provide as an input to provisioning module 346.

In some instances, and prior to providing output data 340 to provisioning module 346, recommendations engine 144 may perform additional operations that rank each of the candidate counterparty identifiers, e.g., in accordance with a likelihood that user 101 will schedule a payment transaction involving the corresponding counterparty during a future temporal interval. In one example, recommendations engine 144 may parse output data 340 and rank each of the candidate counterparty identifiers ordered in accordance with respective ones of the relevance scores (e.g., to generate a ranked list of candidate counterparty identifiers "Washington Gas™," "Washington Post™," "Washington Capitals," "The Wall Street Journal," and "Washington Mutual Insurance" having respective relevance scores of 0.95, 0.9, 0.5, 0.8, 0.2).

In other examples, and consistent with the disclosed embodiments, recommendation engine 144 may perform operations that dynamically rank the candidate counterparty identifiers based on an application of one or more reinforcement learning agents (e.g., an Asynchronous Advantage Actor-Critic (A3C) algorithm) to counterparty-specific input data. Examples of the input data include, but are not limited to, the vector representations of the user transaction data (e.g., as generated using any of the exemplary processes described herein, such as the application of the Doc2Vec™ algorithms), age, last transactions, unranked search payees, and last payees added. Further, and as described herein, the one or more adaptive reinforcement learning agents may be trained against, and adaptively improved using, certain portions of recommendations database 138, which identifies candidate counterparties recommended to these users and links these recommended candidate counterparty identifiers to corresponding ones of the initiated payment transactions.

Referring back to FIG. 3B, provisioning module 346 may receive output data 340, which includes the ranked list of candidate counterparty identifiers (and in some instances, the corresponding relevance scores. In some instances, provisioning module 346 may further process the ranked list of the candidate counterparty identifiers in accordance with at least one provisioning criterion. The at least one provisioning criterion, for example, may be associated with, or may reflect, one or more characteristics of client device 102 (e.g., information characterizing a display functionality of client device 102, such as a resolution or size of display unit 116A) or one or more characteristics of the digital payment interface, e.g., digital payment interface 200 generated and presented by client device 102.

By way of example, client device 102 may be characterized by a limited display resolution, or a reduced display size, and provisioning module 346 may be configured to select, for provisioning to client device 102, a corresponding one of the candidate counterparty identifiers having a maximum of the relevance scores (e.g., "Washington Gas™," having a relevance score of 0.95), or a threshold number of the candidate counterparty identifiers having the largest relevance scores (e.g., the candidate counterparty identifiers associated with the three highest relevance scores, such as "Washington Gas™," "Washington Post™," and "The Wall Street Journal™").

In other instances, provisioning module 346 may be configured to select, for provisioning to client device 102, those candidate counterparty identifiers associated with respective relevance scores that exceed a predetermined threshold value. The predetermined threshold value may, for example, be established by user 101 (e.g., during an initial registration session between client device 102 and transaction system 130) or may be adaptively determined in accordance with the display or input functionalities of client device 102, as described above. For instance, user 101 may establish a threshold relevance score of 0.85, and provisioning module 346 may perform operations that select the candidate counterparty identifiers corresponding to "Washington Gas™" and the "Washington Post™," as the respective relevance scores (e.g., 0.95 and 0.9) each exceed the user-specified threshold value. The disclosed embodiments are, however, not limited to these exemplary provisioning criteria, and in other instances, provisioning module 346 may select one or more of the candidate counterparty identifiers for provisioning in accordance with any additional, or alternate, provisioning criteria appropriate to client device 102 or to the digital payment interface.

Further, although not illustrated in FIG. 3B, provisioning module 346 may also perform operations that access and identify data records within counterparty database 136, e.g., that include corresponding ones of the candidate counterparty identifiers, and update these accessed data records to indicate the selection of the candidate counterparty identifiers for provisioning to client device 102. For example, each accessed data record may include a recommendation counter, and provisioning module 346 may perform operations that increment each of the recommendation counters to reflect the selection of a corresponding one of the candidate counterparty identifiers for provisioning to client device 102.

In some instances, provisioning module 346 may perform operations that extract, from the identified data records of counterparty database 136, additional information characterizing the counterparties associated with each of the selected candidate counterparty identifiers. The additional information may, when provisioned to client device 102, enable executed payment application 108 to perform operations that initiate, or schedule, a payment transaction involving each of the counterparties (e.g., based on a single input from user 101 via input unit 116B), and examples of the additional information include, but are not limited to, a full name of each counterparty or data characterizing an account associated with each counterparty, such as an actual or tokenized account number, a routing number, etc.

As described herein, provisioning module 346 may package the selected candidate counterparty identifiers and the respective reference scores (and in some instances, the respective elements of additional information) into corresponding portions of provisioning data 348, which provisioning module 346 may provide as an input to routing module 350 of transaction system 130. Further, provisioning module 346 may perform additional operations that store all or a portion of provisioning data 348 within the data records of recommendation database 138, along with additional portions of user data 312A and/or device data 312B. As described herein, transaction system 130 may perform operations that train, or adaptively improve, one or more machine learning processes, artificial intelligence models, or deterministic or stochastic statistical processes based on portions of recommendation database 138.

In some instances, routing module 350 may identify and extract, from the one or more tangible, non-transitory memories, a unique network identifier of client device 102 (e.g., from device data 312B). Routing module 350 may perform operation that cause transaction system 130 to transmit provisioning data 348 across network 120 to client device 102, e.g., through a secure, programmatic interface.

Figure 3C:
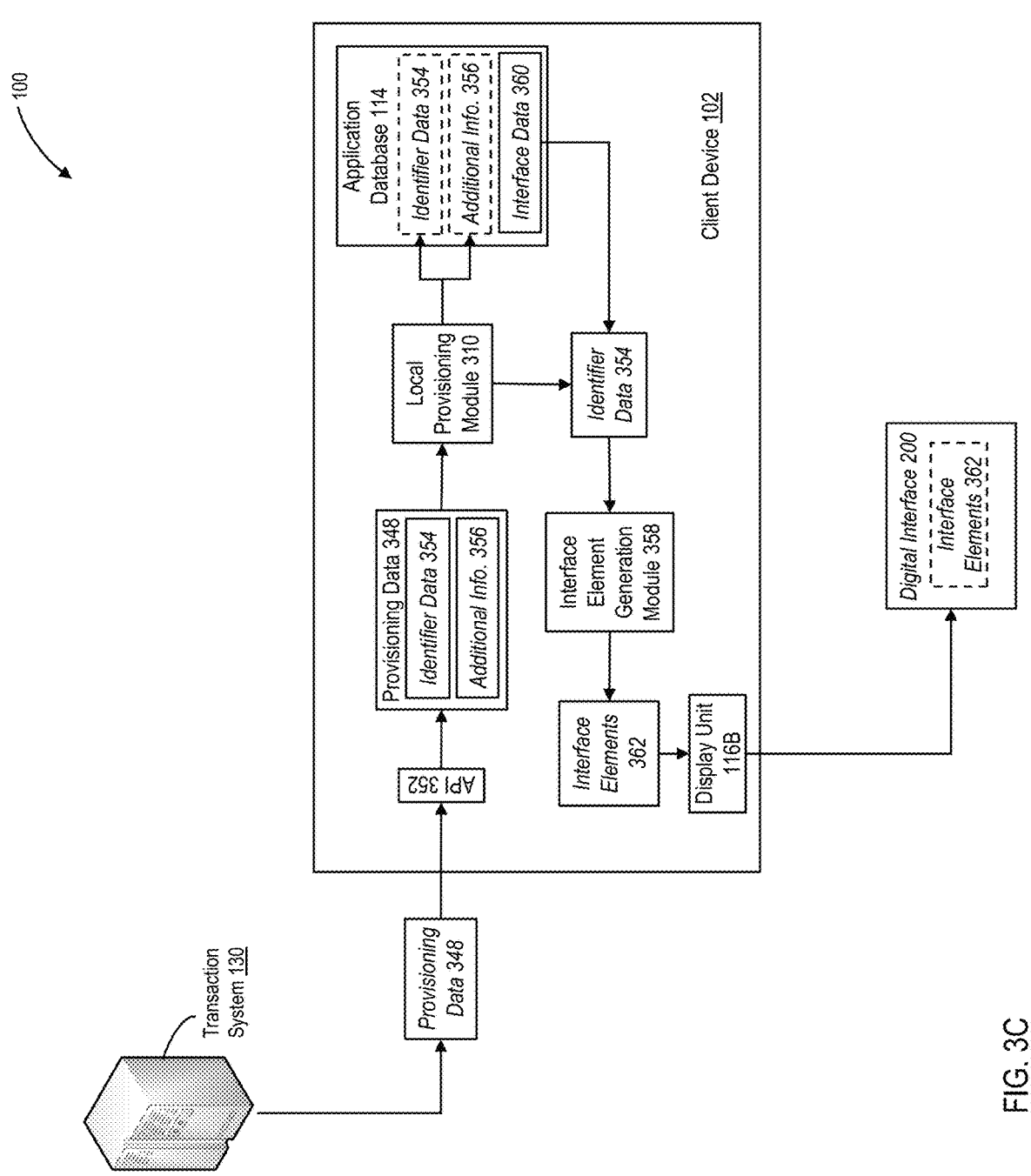

Referring to FIG. 3C, a secure programmatic interface of client device 102, e.g., an application programming interface (API) 352, may receive and route provisioning data 348 to local provisioning module 310 of client device 102. API 352 may be associated with or established by local provisioning module 310, and may facilitate secure, module-to-module communications across network 120 between local provisioning module 310 and routing module 350 of transaction system 130. In some instances, local provisioning module 310 may parse provisioning data 348 to identify and extract identifier data 354, which includes the ordered list of the candidate counterparty identifiers and the respective reference scores, and additional information 356, which facilitates an initiation or scheduling of payment transactions involving counterparties associated with the selected candidate counterparty identifiers, as described herein.

Local provisioning module 310 may store identifier data 354 and additional information 356 within corresponding portions of application data 114 (e.g., as maintained within data repository 110), and may provide identifier data 354 as an input to an interface element generation module 358. In some instances, interface element generation module 358 may access application data 114, and extract interface data 360 that characterizes a layout of the presented digital payment interface, e.g., digital payment interface 200 of FIGS. 2A and 2B. For example, interface data 360 may identify a position, and dimension, of fillable text box 204 of digital payment interface 200, which is assigned to receive the counterparty identifier within digital payment interface 200.

Based on portions of identifier data 354 and interface data 360, interface element generation module 358 may perform operations that generate one or more interface elements 362 that populate fillable text box 204 with a corresponding candidate counterparty identifier (e.g., when identifier data 354 includes a single candidate counterparty identifier), or that establishes a drop-down list of pop-up interface element that includes each of the candidate counterparty identifiers within identifier data 354 (e.g., the threshold number of the candidate counterparty identifiers, or those candidate counterparty identifiers associated with relevance scores that exceed the threshold value). In some instances, interface element generation module 358 may route generated interface elements 362 to display unit 116A of client device 102, which may render interface elements 362 for presentation within a corresponding portion of the digital payment interface, e.g., digital payment interface 200.

Figure 4B:
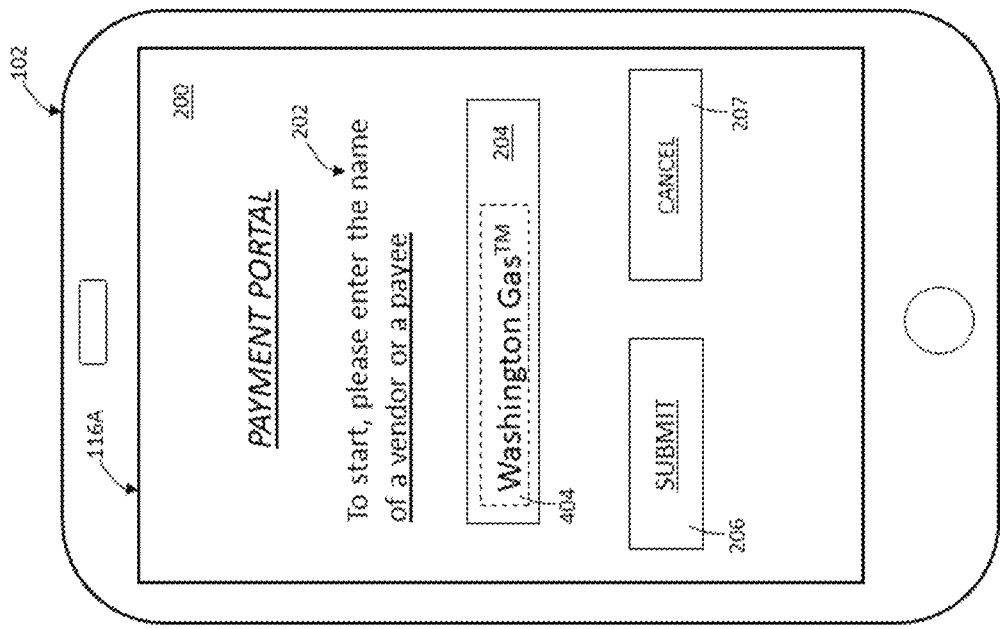
FIGS. 4A, 4B, 4C, 4D, 4E, and 4F are diagrams illustrating portions of an exemplary graphical user interface, consistent with the disclosed embodiments.
Figure 4A:
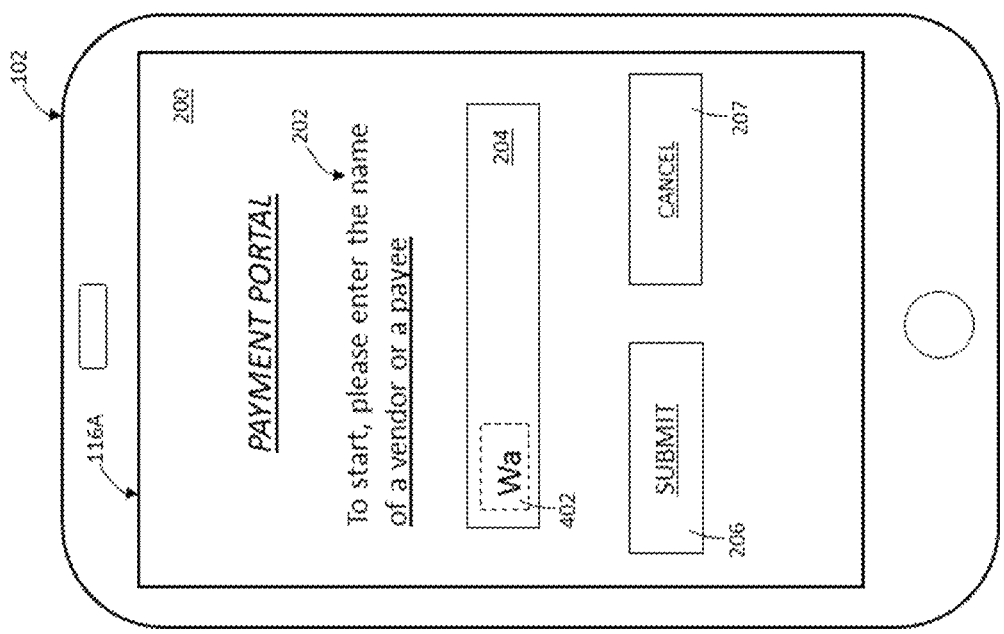

By way of example, as illustrated in FIG. 4A, user 101 may previously provide input to client device 102, e.g., via input unit 116B, that includes a leading portion 402 of a corresponding counterparty identifier, e.g., the characters "Wa" within fillable text box 204. In some examples, when provisioning data 348 includes identifier data 354 specifying a single candidate identifier, e.g., "Washington Gas™," interface element generation module 358 may perform any of the operations described herein to generate one or more interface elements, e.g., interface elements 362, that, when presented within digital payment interface 200, replace leading portion 402 within fillable text box 204. For instance, as illustrated in FIG. 4B, provisioned counterparty identifier 404 may replace leading portion 402 within fillable text box 204 (e.g., "Washington Gas™), and user 101 may provide further input to client device 102 (e.g., via input unit 116B) that selects icon 206. As described herein, and in response to the selection, executable application program 108 may generate and present further interface elements within digital payment interface 200 (not illustrated in FIG. 4B) that facilitate an initiation, or a future scheduling, of the payment associated with the outstanding invoice issued by Washington Gas™, e.g., as a single instance or on a recurring basis.

In further examples, when identifier data 354 specifies multiple candidate counterparty identifiers (e.g., "Washington Gas™," "Washington Post™," and "The Wall Street Journal™," as described herein), interface element generation module 358 may perform any of the operations described herein to generate one or more interface elements, e.g., interface elements 362, that, when presented within digital payment interface 200, collectively establish a drop-down list disposed proximate to fillable text box 204 in digital payment interface 200. For instance, as illustrated in FIG. 4C, display unit 116A may render interface elements 362 for presentation as a drop-down list 405 at a position below fillable text box 204 within digital payment interface 200, and drop-down list 405 may include individual interface elements 406, 408, and 410 that represent of corresponding ones of the candidate counterparty identifiers, e.g., "Washington Gas™," "Washington Post™," and "The Wall Street Journal™."

Figure 4D:
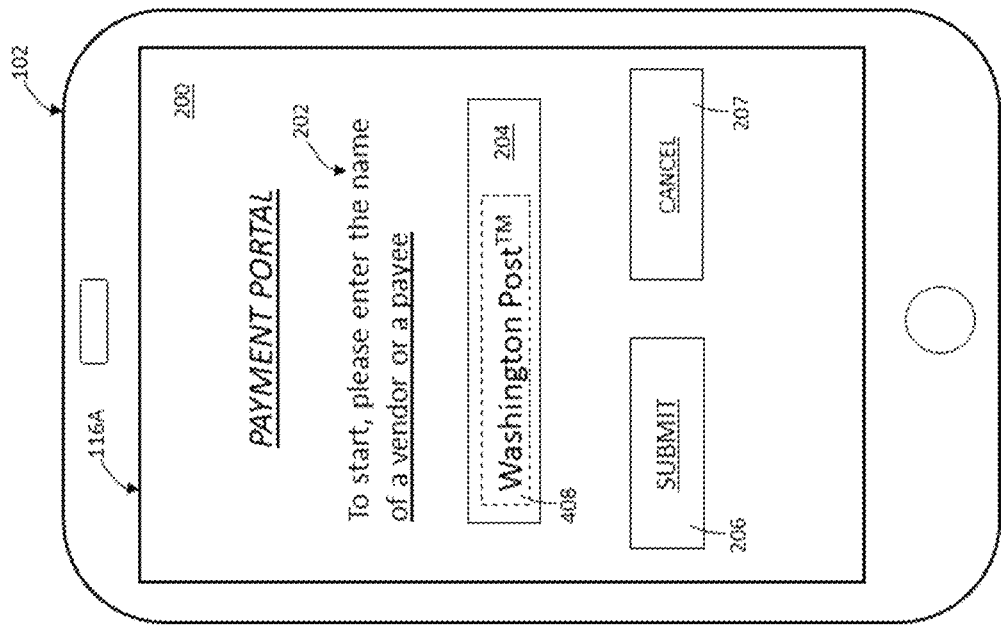
Figure 4C:
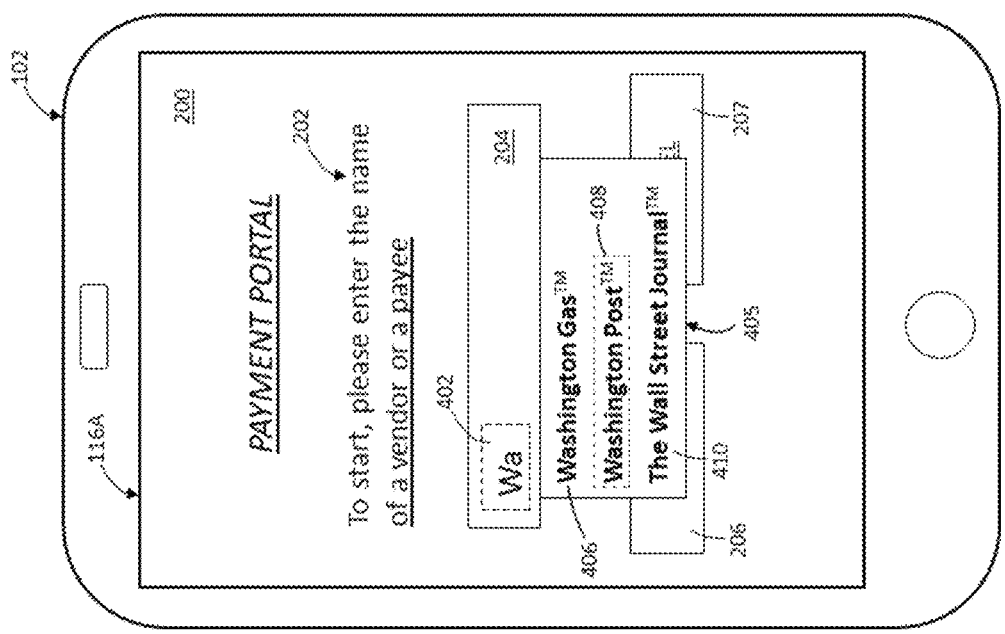

In some instances, user 101 may provide further input to client device 102 (e.g., via input unit 116B) that selects interface element 408 within drop-down list 405, which corresponds to the candidate counterparty identifier for "Washington Post™." In response to the selection, and as illustrated in FIG. 4D, display unit 116A may perform operations that replace leading portion 402 with interface element 408 (e.g., associated with "Washington Post™) within fillable text box 204. As described herein, user 101 may provide further input to client device 102 (e.g., via input unit 116B) that selects icon 206 and in response to the selection, executable application program 108 may generate and present further interface elements within digital payment interface 200 (not illustrated in FIG. 4D) that facilitate an initiation, or a future scheduling, of the payment associated with the outstanding invoice issued by Washington Post™, e.g., as a single instance or on a recurring basis.

In other examples, and when identifier data 354 specifies multiple candidate counterparty identifiers (e.g., "Washington Gas™," "Washington Post™," and "The Wall Street Journal™," as described herein), interface element generation module 358 may perform any of the operations described herein to generate one or more interface elements, e.g., interface elements 362, that, when presented within digital payment interface 200, collectively establish a pop-up window in digital payment interface 200. For example, as illustrated in FIG. 4E, display unit 116A may render interface elements 362 for presentation as pop-up window 412 at a position within digital payment interface 200 that obscures at least a portion of fillable text box 204, and pop-up window 412 may include individual interface elements 414, 416, and 418 that represent of corresponding ones of the candidate counterparty identifiers, e.g., "Washington Gas™," "Washington Post™," and "The Wall Street Journal™."

Figure 4F:
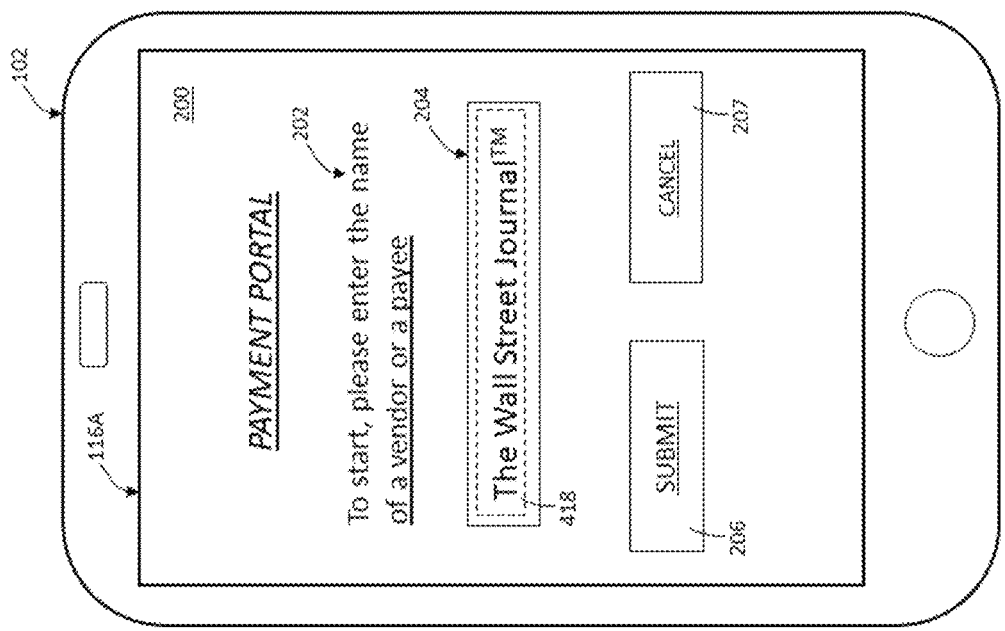
Figure 4E:
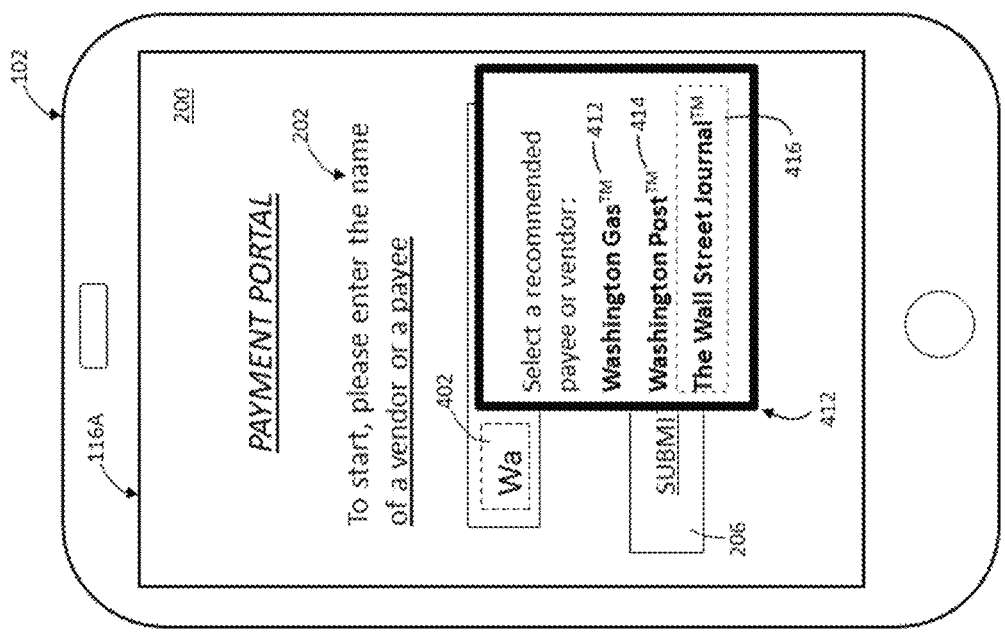

In some instances, user 101 may provide further input to client device 102 (e.g., via input unit 116B) that selects interface element 418 within pop-up window 412, which corresponds to the candidate counterparty identifier for "The Wall Street Journal™." In response to the selection, and as illustrated in FIG. 4F, display unit 116A may perform operations that replace leading portion 402 with interface element 418 (e.g., associated with "The Wall Street Journal™) within fillable text box 204. As described herein, user 101 may provide further input to client device 102 (e.g., via input unit 116B) that selects icon 206 and in response to the selection, executable payment application 108 may generate and present further interface elements within digital payment interface 200 (not illustrated in FIG. 4F) that facilitate an initiation, or a future scheduling, of the payment associated with the outstanding invoice issued by The Wall Street Journal™, e.g., as a single instance or on a recurring basis.

In some instances, and in response to additional input from user 101, e.g., via input unit 116B of client device, executable payment application 108 may perform additional operations that identify the selected one of the presented counterparty identifies (e.g., the counterparty identifiers of "Washington Gas™," "Washington Post™," or "The Wall Street Journal"), access application data 114 (e.g., as maintained within data repository 110), and obtain a corresponding portion stored additional information 356 that includes, or references, the selected counterparty identifier. As described herein, the corresponding portion of additional information 356 may include, but is not limited to, a full name of the counterparty associated with the selected counterparty identifier and data characterizing an account associated with that, such as the actual or tokenized account number. Further, although not illustrated in FIGS. 4A-4F, executed payment application 108 may also generate one or more further interface elements for presentation within digital payment interface 200 that prompts user 101 to specify additional values of parameter that characterize the initiated or scheduled payment application, such as, but not limited to, a transaction date or time or a transaction value, such as a balance of an outstanding invoice.

In response to a receipt of additional input specifying these additional parameter values, e.g., as provided to input unit 116B, executable payment application 108 may perform operations that generate transaction data characterizing the initiated or scheduled payment transaction (e.g., including the transaction date or time, the transaction value, the selected counterparty identifier, and the counterparty account data, as described herein). Executed payment application 108 may, in some instances, perform operations that store the transaction data within a corresponding portion of application data 114, and that cause client device 102 to transmit the generated transaction data across network 120 to transaction system 130, e.g., using a secure, programmatic interface, along with additional data identifying user 101 (e.g., the alphanumeric login credential) and/or client device 102 (e.g., the network address, such as the assigned IP or MAC address).

In some instances, API 320 of transaction system 130 may receive the generated transaction data, and one or more application programs, program modules, or compiled code elements executed by transaction system 130 may process and store the generated transaction data within a corresponding portion of transaction database 134, along with the data identifying user 101 and/or client device 102. Further, and as described herein, transaction system 130 may also perform operations that access and identify data records within counterparty database 136, e.g., that include corresponding ones of the candidate counterparty identifiers, and update these accessed data records to indicate the initiation or scheduling of the payment transaction including the selected counterparty identifier. For example, each accessed data record may include a transaction counter, and provisioning module 346 may perform operations that increment each of the transaction counter to reflect the initiation or scheduling of the payment transactions.

In other instances, the one or more application programs, program modules, or compiled code elements executed by transaction system 130 may also access profile data associated with user 101 (e.g., first profile data 330 of user database 132, as maintained within the one or more tangible non-transitory memories), and store the selected counterparty identified within a corresponding portion of profile data 330 that identifies counterparties to initiated or scheduled payment transactions involving user 101 (e.g., first counterparty data 330B of first profile data 330). Further, transaction system 130 may perform additional operations that execute the payment transaction in accordance with the specified values of the transaction parameters.

In additional examples, also not illustrated in FIGS. 4A-4F, executed payment application 108 may also generate one or more further interface elements for presentation within digital payment interface 200 that prompts user 101 to establish or register the counterparty associated with the selected counterparty identifier as a payee or vendor of one or more digital payment processes, such as those described herein. In some instances, these additional presented interface elements may prompt user 101 to provide additional input to client device 102, e.g., via input unit 116B, that confirms user 101's intention to establish the associated counterparty as the registered payee or vendor, and that specifies a nickname for the associated counterparty (or to modify an existing nickname for the associated counterparty).

In response to a receipt of addition input specifying these additional parameter values, e.g., as provided to input unit 116B, executable payment application 108 may perform operations that generate registration data characterizing the associated counterparty (e.g., including the selected counterparty identifier or the newly specified or modified nickname, etc.). Executed payment application 108 may, in some instances, perform operations that store the registration data within a corresponding portion of application data 114, and that cause client device 102 to transmit the registration transaction data across network 120 to transaction system 130, e.g., using a secure, programmatic interface, along with additional data identifying user 101 (e.g., the alphanumeric login credential) and/or client device 102 (e.g., the network address, such as the assigned IP or MAC address).

In some instances, API 320 of transaction system 130 may receive the generated transaction data, and the one or more application programs, program modules, or compiled code elements executed by transaction system 130 may access profile data associated with user 101 (e.g., first profile data 330 of user database 132). Transaction system 130 may perform further operations that store all or a subset of the registration data within a corresponding portion of profile data 330 that identifies counterparties established as registered payees or vendors for bill-payment processes involving user 101, including those exemplary processes described herein (e.g., within first counterparty data 330B of first profile data 330).

Figure 5:
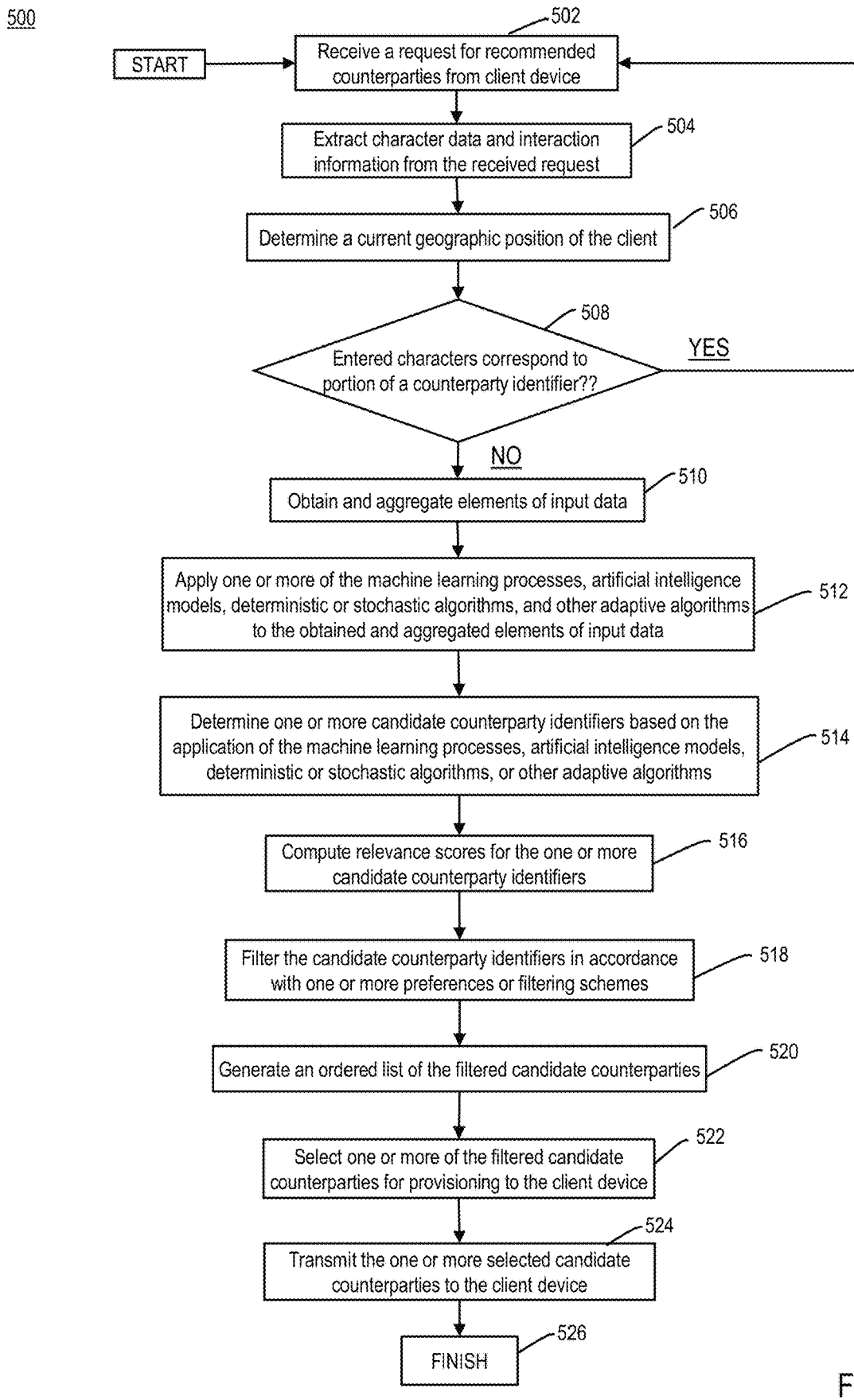
FIG. 5 is a flowchart of an exemplary process for automatically populating digital interfaces based on dynamically generated contextual data, consistent with the disclosed embodiments.

FIG. 5 is a flowchart of an exemplary process 500 for automatically populating digital interfaces based on dynamically generated contextual data. In some examples, a network-connected computing system, such as transaction system 130 of FIG. 1, may perform one or more of the exemplary steps of process 500.

Referring to FIG. 5, transaction system 130 may receive a request from a network-connected device, such as client device 102, for one or more recommended counterparties to an exchange of data capable of initiation at client device 102 (e.g., in step 502). In some instances, and as described herein, the exchange of data can include to a payment transaction capable of initiation by an application program executed at client device 102, e.g., payment application 108 of FIG. 1. The request may be generated by executed payment application 108 in response to an input, by user 101 to client device 102 (e.g., to input unit 116B of FIG. 1), of one or more characters into a corresponding portion of a digital payment interface generated and rendered for presentation by executed payment application 108 (e.g., on display unit 116A of FIG. 1).

In some instances, transaction system 130 that parse the received request to extract data identifying the one or more characters, along with additional information characterizing the interaction of user 101 during entry of the one or more characters into the portion of the digital payment interface (e.g., in step 504). Further, in step 504, transaction system may also parse the received request to identify and extract user data characterizing user 101, such as, but not limited to, an alphanumeric login credential assigned to user 101 by transaction system 130, and additionally, or alternatively, device data characterizing client device 102, such as, but not limited to, a unique network address of client device 102 (e.g., an IP address, a MAC address, etc.). Also, in step 504, transaction system 130 may perform operations that store the received request within a corresponding portion of a tangible, non-transitory memory.

Transaction system 130 may also perform operations that determine a current geographic location of client device 102 (e.g., in step 506). In one example, transaction system 130 may perform operations that detect the current geographic location of client device based on an analysis of the IP address assigned to client device 102, e.g., as extracted from the received request. In other examples, and as described herein, client device 102 may include a positioning unit (e.g., positional unit 117 of FIG. 1), and the received request may include positional data that identifies the current geographic position captured by positioning unit 117 (e.g., a most recently captured geographic position of client device 102). Additionally, or alternatively, client device 102 may be configured to transmit its current geographic position (e.g., as captured by positioning unit 117) across network 120 to transaction system 130 at predetermined intervals or in response to a detected occurrence of a triggering event (e.g., a "push" operation), or in response to a request generated and transmitted to client device 102 by transaction system 130 (e.g., a "push" operation).

In some instances, transaction system 130 may process the received request to determine whether the one or more entered characters correspond to a portion of an identifier of a counterparty a payment transaction capable of initiation at client device (e.g., in step 508). By way of example, and based on a portion of the extracted interaction information, transaction system 130 may establish that user 101 entered the one or more characters (e.g., within the extracted character data) into a particular interface element presented within the digital payment interface, e.g., fillable text box 204 of FIGS. 2A and 2B. Transaction system 130 may also obtain, from one or more tangible, non-transitory memories, layout data identifying and characterizing the interface elements presented within the digital payment interface. Based on the extracted interaction information and the obtained layout data, transaction system 130 may determine in step 508 whether the particular interface element is designated to receive the counterparty identifier within the digital payment interface and as such, whether the one or more counterparties correspond to the portion of the counterparty identifier.

If transaction system 130 were to determine that the particular interface element is not designated to receive the counterparty identifier, transaction system 130 may determine that the one or more characters do not correspond to the portion of the counterparty identifier (step 508; NO). In some instances, exemplary process 500 may pass back to step 502, and transaction system 130 may await a receipt of an additional request from client device 102.

Alternatively, if transaction system 130 were to determine that the particular interface element is designated to receive the counterparty identifier, transaction system 130 may determine that the one or more characters correspond to the portion of the counterparty identifier (step 508; YES). In some instances, in step 510, transaction system 130 may perform any of the exemplary processes described herein to obtain and aggregate: (i) elements of profile data that characterizes user 101 and other users of transaction system 130; (ii) elements of transaction data that identifies and characterizes prior payment transactions involving user 101 and the other users; and (iii) and elements of counterparty frequency data characterizing a frequency at which user 101 and the other user received recommendations of particular counterparty identifiers, or initiated or scheduled payment transactions involving particular counterparties.

By way of example, the elements of profile data may include, for each of user 101 and the other users, a full name, contact information (e.g., a mobile telephone number or email address), and positional information, such as a home address or a corresponding specified geographic region. The elements of profile data may also include, for each of user 101 and the other users, demographic data specifying values of one or more demographic characteristics exhibited by or associated with user 101, such as, but not limited to, an age, a gender, a profession, or a level of education of user 101. The obtained and aggregated elements of profile data may further identify one or more counterparties to corresponding payment transactions initiated by each of user 101 and the other users during prior temporal intervals, or scheduled for initiation, e.g., individually or on a recurring basis, during future temporal intervals. In some instances, the elements of profile data may also characterize one or more preferences of one or more of user 101 or the other users for receiving recommendations of candidate counterparty identifiers, such as, but not limited to, any of the counterparty-specific and geographic preferences described herein.

In further examples, the transaction data obtained and aggregated for user 101 and the other users of transaction system 130 may identify and characterize prior payment transactions involving corresponding ones of user 101 and the other users during the prior temporal intervals. For example, as described herein, each element of the obtained and aggregated transaction data may be associated with a corresponding payment transaction initiated during the prior temporal intervals, and may include data associated with a corresponding user (e.g., an alphanumeric login credential or a network identifier of a corresponding device of user 101 or one of the other users), a corresponding counterparty identifier, and values of parameters characterizing the corresponding payment transaction. In additional examples, and as described herein, the obtained and aggregated elements of counterparty frequency data may characterize a frequency at which users of transaction system 130, such as user 101, initiate payment transactions involving one or more counterparties, or frequency at which transaction system 130 identifies the one or more counterparties for provisioning to client device 102 as recommended counterparties.

In some instances, transaction system 130 may apply one or more of the machine learning processes, artificial intelligence models, deterministic or stochastic algorithms, and other adaptive algorithms described herein to the character data extracted from the received request, to the current geographic position of client device 102, and to one or more portions of the obtained and aggregated profile data, transaction data, and counterparty frequency data (e.g., in step 512). Further, and based on the application of these one or more machine learning processes, artificial intelligence models, deterministic or stochastic algorithms, or adaptive processes (e.g., in step 512), transaction system 130 may perform any of the processes described herein to determine that one or more candidate counterparty identifiers that are consistent with portions of the character data and/or the current geographic position of client device 102 and further, are contextually relevant to prior payment transactions involving user 101 and in some instances, other users exhibiting demographic or geographic characteristics similar to those exhibited by user 101 (e.g., in step 514).

Further, and as described herein, transaction system 130 may also perform any of the exemplary processes described herein to compute, for each of the candidate counterparty identifiers, a metric, e.g., a relevance score, indicative of a relevance of that candidate counterparty identifier to the extracted character data and additionally, or alternatively, to the current geographic position of client device 102 (e.g., also in step 516). In some instances, the relevance score for a corresponding one of the candidate counterparty identifiers may also be indicative of a likelihood that user 101 will schedule a payment transaction involving the corresponding counterparty during a future temporal interval, e.g., based on a predictive analysis of the character data, the current geographic position of client device 102, and the one or more portions of the obtained and aggregated profile data, transaction data, and counterparty frequency data using any of the exemplary processes described herein.

Transaction system 130 may also perform any of the exemplary processes described herein to filter the candidate counterparty identifiers (and the respective relevance scores) in accordance to with one or more counterparty-specific or geographic preferences of user 101 and additionally, or alternatively, in accordance with one or more textual or geographic filtration schemes (e.g., in step 518). For example, and as described herein, transaction system 130 may perform any of the processes described herein to extract data characterizing the counterparty-specific or geographic preferences from a corresponding portion of the obtained and aggregated profile data associated with user 101.

Further, in some instances, transaction system 130 may also perform any of the exemplary processes described herein to generate an ordered list of filtered candidate counterparty identifiers based on the corresponding relevance score (e.g., in step 520), and to select one or more of the filtered counterparty identifiers for provisioning to client device 102 (e.g., in step 522). Transaction system 130 may, in some instances, perform operations that package each of the selected counterparty identifiers and respective relevance scores into a corresponding portion of provisioning data, which transaction system 130 may transmit to client device 102 across network 120 using any appropriate communications protocol (e.g., in step 524). In some instances, and as described herein, transaction system 130 may also obtain and package, into the provisioning data, additional information that, when provisioned to client device 102, enables executed payment application 108 to initiate, or schedule, a payment transaction involving each of the counterparties using any of the exemplary processes described herein (e.g., based on a single input from user 101 via input unit 116B).

In some instances, client device 102 may receive the provisioning data, e.g., through a secure programmatic interface (such as an application programming interface). As described herein, executed application program 108 may perform operations that cause client device 102 to parse the provisioning data to extract the one or more selected counterparty identifiers and the additional information, and to generate interface elements representative each of the one or more selected counterparty identifiers for presentation within a corresponding portion of the digital payment interface, as described herein. Exemplary process 500 is then complete in step 526.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, payment application 108, one or more of application programs 140, monitoring engine 142, recommendation engine 144, transaction initiation module 306, local provisioning module 310, routing module 312, management module 322, predictive module 342, filtering module 344, provisioning module 346, routing module 350, API 352, and interface element generation module 358, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a storage unit storing instructions; and
at least one processor coupled to the communications unit and the storage unit, the at least one processor being configured to execute the instructions to:
  receive a first signal from a first device via the communications unit, the first device being associated with a first counterparty to a payment transaction involving a second counterparty, the first signal comprising a portion of a first identifier of the second counterparty, the payment transaction being capable of initiation using an application program executed by the first device, the portion of the first identifier comprising one or more characters, and the first device being configured to receive the one or more characters as an input to an element of an interface associated with the payment transaction;
  apply at least one of a trained machine learning process, a trained artificial intelligence model, or a trained statistical process to input data that includes a current geographic position of the first device and the one or more characters of the first identifier of the second counterparty;
  based on the application of the trained machine learning process, the trained artificial intelligence model, or the trained statistical process to the input data, determine a plurality of candidate identifiers for the second counterparty;
  compute, for each of the candidate identifiers of the second counterparty, a metric indicative of a relevance of the candidate identifier to the one or more characters of the first identifier of the second counterparty and the geographic position of the first device;

perform operations that prioritize the candidate identifiers of the second counterparty based on corresponding ones of the computed metrics; and generate and transmit, to the first device via the communications unit, a second signal that includes the prioritized candidate identifiers of the second counterparty, the second signal comprising information that causes the executed application program to present the prioritized candidate identifiers within an additional element of the interface, and the additional element being disposed proximate to the element within the interface.

2. The apparatus of claim 1, wherein the at least one processor is further configured to:

determine that the second identifier includes at least the subset of the one or more characters of the first identifier that identify the second counterparty; and when the second identifier includes at least the subset of the one or more characters of the first identifier, generate and transmit the second signal to the first device.

3. The apparatus of claim 1, wherein the at least one processor is further configured to generate and transmit the second signal to the first device when a geographic position associated with the counterparty is at least one of (i) disposed within a threshold distance of the current geographic position of the first device or (ii) disposed within a geographic region that includes the current geographic position of the first device.

4. The apparatus of claim 1, wherein the at least one processor is further configured to:

load, from the storage unit, an element of profile data associated with the first device and counterparty data that characterizes the second counterparty;

extract, from the element of profile data, information characterizing one or more notification preferences associated with the first device; and generate and transmit the second signal to the first device when the counterparty data is consistent with the one or more notification preferences.

5. The apparatus of claim 4, wherein:

the counterparty data comprises at least one of the second identifier of the second counterparty, a geographic position associated with the second counterparty, or a counterparty class associated with the second counterparty; and the one or more notification preferences comprise at least one of a geographic preference or a counterparty preference, the one or more notification preferences being specified by the first counterparty.

6. The apparatus of claim 4, wherein the at least one processor is further configured to generate and transmit the second signal to the first device when the counterparty data is consistent with at least one filtration criterion and with the one or more notification preferences.

7. The apparatus of claim 6, wherein the filtration criterion comprises a geographic criterion imposed on a geographic position of the second counterparty, the geographic criterion specifying a disposition of the geographic position of the second counterparty is within at least one of a threshold distance from the current geographic position of the first device or within a geographic region that includes the current geographic position of the first device.

8. The apparatus of claim 1, wherein the at least one processor is further configured to:

load, from the storage unit, a first element of profile data associated with the first device and one or more second elements of profile data associated with a corresponding second device;

extract first demographic data from the first element of profile data, and extract second demographic data from each of the second elements of profile data;

determine the second identifier of the second counterparty to the data exchange based on an application of at least one of a trained machine learning process, a trained artificial intelligence model, or a trained statistical process to the extracted first and second demographic data and to at least one of the current geographic position or the one or more characters of the first identifier of the second counterparty;

compute a metric indicative of a relevance of (i) the second identifier of the second counterparty to the received portion of the first identifier and (ii) the second counterparty to the current geographic position of the first device; and based on the computed metric, transmit the second signal that includes the second identifier of the second counterparty to the first device via the communications unit.

9. The apparatus of claim 1, wherein the at least one processor is further configured to:

load, from the storage unit, a first element of profile data associated with the first device;

determine third identifiers of the second counterparty to the payment transaction based on at least one of the current geographic position, the first element of profile data, or the one or more characters of the first identifier of the second counterparty; and generate and transmit, to the first device via the communications unit, a third signal that includes each of the third identifiers, the third signal comprising information that causes the executed application program to present the third identifiers within an additional portion of the interface associated with the payment transaction.

10. The apparatus of claim 1, wherein:

the first signal comprises the current geographic position of the first device, and the at least one processor is further configured to store the current position of the first device within the storage unit;

the application program executed by the first device generates the interface; and the information further causes the executed application program to replace the one or more characters within the element of the interface with the second identifier.

11. The apparatus of claim 1, wherein:

the at least one processor is further configured to determine the second identifier of the second counterparty based on an application of at least one of a trained machine learning process, a trained artificial intelligence model, or a trained statistical process to at least one of a current geographic position of the first device, the first element of profile data, or the one or more characters of the first identifier; and the application program executed by the first device comprises at least one of a payment application or a wallet application.

12. The apparatus of claim 1, wherein the at least one processor is further configured to:

load, from the storage unit, an element of profile data associated with the first device; and determine the second identifier of the second counterparty based on the element of profile data, the current geographic position, and the received portion of the first identifier of the second counterparty.

13. The apparatus of claim 1, wherein:
the one or more characters of the first identifier of the second counterparty comprise a first character string;
the second identifier of the second counterparty comprises a second character string, the second character string having a leading portion; and
the leading portion of the second character string comprises the first character string.

14. A computer-implemented method, comprising:
receiving, by one or more processors, a first signal from a device, the device being associated with a first counterparty to a payment transaction involving a second counterparty, the first signal comprising a portion of a first identifier of the second counterparty, the payment transaction being capable of initiation using an application program executed by the device, the portion of the first identifier comprising one or more characters, and the device being configured to receive the one or more characters as an input to an element of an interface associated with the payment transaction;
applying at least one of a trained machine learning process, a trained artificial intelligence model, or a trained statistical process to input data that includes a current geographic position of the device and the one or more characters of the first identifier of the second counterparty;
based on the application of the trained machine learning process, the trained artificial intelligence model, or the trained statistical process to the input data, determining a plurality of candidate identifiers for the second counterparty;
computing, for each of the candidate identifiers of the second counterparty, a metric indicative of a relevance of the candidate identifier to the one or more characters of the first identifier of the second counterparty and the geographic position of the device;
performing operations that prioritize the candidate identifiers of the second counterparty based on corresponding ones of the computed metrics; and
generating and transmitting, by the one or more processors, a second signal that includes the prioritized candidate identifiers of the second counterparty to the device, the second signal comprising information that causes the executed application program to present the prioritized candidate identifiers within an additional element of the interface, and the additional element being disposed proximate to the element within the interface associated with the payment transaction.

15. An apparatus, comprising:
a communications unit;
a storage unit storing instructions; and
at least one processor coupled to the communications unit and the storage unit, the at least one processor being configured to execute the instructions to:
receive a first signal from a device via the communications unit, the device being associated with a first counterparty to a payment transaction involving a second counterparty, the first signal comprising a portion of a first identifier of the second counterparty, the payment transaction being capable of initiation using an application program executed by the device, the portion of the first identifier comprising one or more characters, and the device being configured to receive the one or more characters as an input to a first element of an interface generated by the executed application program;
apply at least one of a trained machine learning process, a trained artificial intelligence model, or a trained statistical process to input data that includes the one or more characters of the first identifier of the second counterparty and a geographic position of the device;
based on the application of the trained machine learning process, the trained artificial intelligence model, or the trained statistical process to the input data, determine a plurality of second identifiers of the second counterparty to the payment transaction;
compute, for each of the second identifiers of the second counterparty, a metric indicative of a relevance of the second identifier to the one or more characters of the first identifier of the second counterparty and the geographic position of the device;
perform operations that prioritize the second identifiers of the second counterparty based on corresponding ones of the computed metrics; and
generate and transmit, to the device via the communications unit, a second signal that includes the prioritized second identifiers of the second counterparty, the second signal comprising information that causes the executed application program to present the prioritized second identifiers within an additional element of the interface, and the additional element being disposed proximate to the first element within the generated interface.

16. The apparatus of claim 15, wherein the at least one processor is further configured to generate and transmit the second signal to the device when a geographic position associated with the counterparty is at least one of (i) disposed within a threshold distance of the current geographic position of the device or (ii) disposed within a geographic region that includes the current geographic position of the device.

17. The apparatus of claim 15, wherein the at least one processor is further configured to:
establish that a subset of the second identifiers are each consistent with the received portion of the first identifier; and
generate and transmit, to the device via the communications unit, a third signal that includes the subset of the second identifiers, the third signal comprising information that causes the executed application program to present the subset of the second identifiers within a second element of the generated interface, the second element being disposed proximate to the first element within the interface.

18. The apparatus of claim 15, wherein the information further causes the executed application program to replace, within the first element of the interface, the one or more characters of the first identifier of the second counterparty with the second identifier of the second counterparty.

* * * * *